US012427717B2

(12) United States Patent
Singer et al.

(10) Patent No.: US 12,427,717 B2
(45) Date of Patent: Sep. 30, 2025

(54) METHODS AND DEVICES FOR THICKNESS-LIMITED ELECTROSPRAY ADDITIVE MANUFACTURING

(71) Applicant: Rutgers, the State University of New Jersey, New Brunswick, NJ (US)

(72) Inventors: Jonathan P. Singer, Cranford, NJ (US); Howon Lee, Seoul (KR)

(73) Assignee: Rutgers, the State University of New Jersey, New Brunswick, NJ (US)

( * ) Notice: Subject to any disclaimer, the term of this patent is extended or adjusted under 35 U.S.C. 154(b) by 778 days.

(21) Appl. No.: 17/595,341

(22) PCT Filed: May 15, 2020

(86) PCT No.: PCT/US2020/033020
§ 371 (c)(1),
(2) Date: Nov. 15, 2021

(87) PCT Pub. No.: WO2020/232317
PCT Pub. Date: Nov. 19, 2020

(65) Prior Publication Data
US 2022/0234058 A1 Jul. 28, 2022

Related U.S. Application Data

(60) Provisional application No. 62/848,320, filed on May 15, 2019.

(51) Int. Cl.
*B29C 64/188* (2017.01)
*B05B 5/025* (2006.01)
(Continued)

(52) U.S. Cl.
CPC .......... *B29C 64/188* (2017.08); *B05B 5/0255* (2013.01); *B05D 1/04* (2013.01);
(Continued)

(58) Field of Classification Search
CPC ....... B29C 64/188; B33Y 30/00; B33Y 70/00; B05B 5/0255; B05D 1/04
See application file for complete search history.

(56) References Cited

U.S. PATENT DOCUMENTS 10,005,219 B2   6/2018   Gerstenhaber et al.
2013/0216724 A1  8/2013  Lee et al.
(Continued)

FOREIGN PATENT DOCUMENTS

FR   3033666 A1     9/2016
WO   2019241394 A1  12/2019

OTHER PUBLICATIONS

International Search Report and Written Opinion for International Patent Application No. PCT/US20/33020 dated Aug. 19, 2020, pp. 1-16.
(Continued)

*Primary Examiner* — Jerzi H Moreno Hernandez
(74) *Attorney, Agent, or Firm* — Wolter Van Dyke Davis, PLLC; Eugene J. Molinelli; Cian G. O'Brien

(57) ABSTRACT

A method for simultaneous additive manufacturing and thickness-limited, electrospray deposition may include forming an electrically conductive target via additive manufacturing and exposing the electrically conductive target to an incident spray comprising a thermo-responsive polymer solution, in the presence of an electric field. The electrically conductive target may have a surface temperature, the thermo-responsive polymer solution may have a solution temperature, and the thermo-responsive polymer solution may include a non-conductive polymer. The method may further include allowing the solution temperature to deviate toward the surface temperature to a deposited temperature at which the non-conductive polymer is immobile. The method may further include allowing the non-conductive polymer to (Continued)

Figure 1:
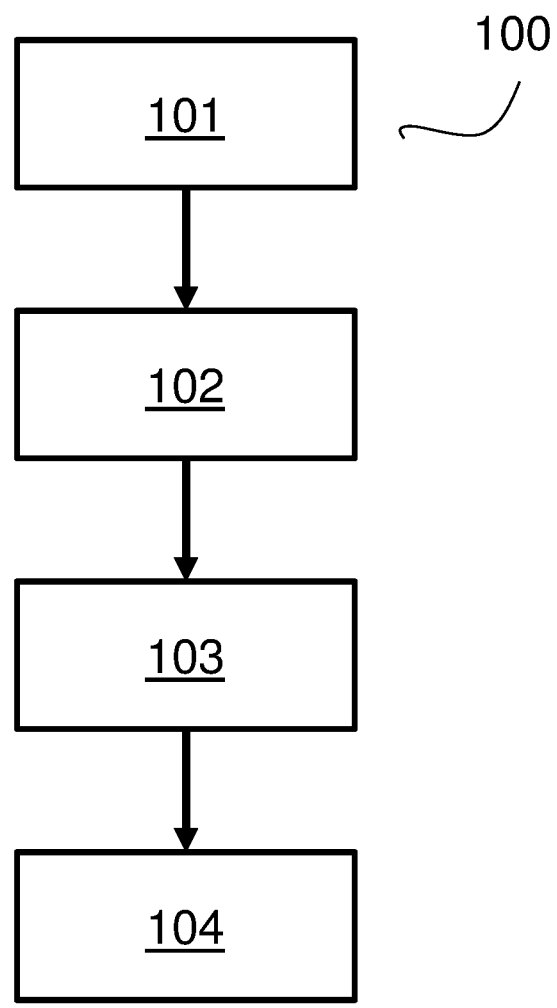

accumulate on the electrically conductive target to form a layer, having a thickness sufficient to repulse the incident spray.

19 Claims, 16 Drawing Sheets

(51) Int. Cl.
*B05D 1/04* (2006.01)
*B33Y 10/00* (2015.01)
*B33Y 30/00* (2015.01)
*B33Y 70/00* (2020.01)

(52) U.S. Cl.
CPC ............... *B33Y 10/00* (2014.12); *B33Y 30/00* (2014.12); *B33Y 70/00* (2014.12)

(56) References Cited

U.S. PATENT DOCUMENTS

| | | |
|---|---|---|
| 2016/0009029 A1 | 1/2016 | Cohen et al. |
| 2017/0108772 A1 | 4/2017 | Mirkin et al. |
| 2018/0264248 A1 | 9/2018 | Adenusi et al. |

OTHER PUBLICATIONS

Lei, et al., Obtaining Thickness-Limited Electrospray Deposition for 30 Coating. ACS Appl. Mater. Interfaces, 0.1021/acsami. 7b19812, Mar. 15, 2018, pp. 1-59.

300

METHODS AND DEVICES FOR THICKNESS-LIMITED ELECTROSPRAY ADDITIVE MANUFACTURING

CROSS-REFERENCE TO RELATED APPLICATION

This application is a 371 national stage application of PCT Application No. PCT/US2020/033020, filed May 15, 2020, and claims the benefit of U.S. Provisional Patent Application No. 62/848,320, filed May 15, 2019, titled THICKNESS-LIMITED ELECTROSPRAY DEPOSITION OF THERMORESPONSIVE MATERIALS, which are hereby incorporated by reference in their entirety.

BACKGROUND

Micro/nanoscale conformal coatings can be applied in either the molecular or condensed state. Molecular deposition techniques, such as electrodeposition, vacuum deposition, atomic layer deposition, or chemical vapor deposition, generally require either a fluid bath or high-vacuum to apply and may also require high-temperature precursor processing. This offsets their cost-benefit considerations and limits the size of the component that can be coated. Condensed deposition techniques, such as spray coating, dip coating, spin coating, and brush or blade coating struggle with 3D surfaces and result in capillary or shadowing effects.

Widespread use of additive manufacturing is increasing exponentially. Industries using additive manufacturing include aerospace, agriculture, architecture, engineering, construction, automotive, consumer products, education, high tech, industrial equipment, biomedical implants, prosthetics, dental, jewelry, electronics. Various industries utilize additive manufacturing to design and build prototypes, tooling, and end-use parts. Existing additive manufacturing techniques, including extrusion-based additive manufacturing techniques, such as direct ink writing and fused deposition modeling are among the most widely used additive manufacturing methods. These techniques rely on the material ejection apparatus to direct the material being printed to the desired target location and do not provide any mechanism to redirect material away from its ejection vector toward uncoated regions of the target location. Furthermore, according to existing methods, if a 3D printed component is to be coated it would be done in an entirely different process.

SUMMARY

Various embodiments relate to a method of thickness-limited, electrospray deposition. The thickness-limited electrospray deposition may be conducted concurrently with or after an additive manufacturing process. The method may include exposing an electrically conductive target to an incident spray comprising a thermo-responsive polymer solution, in the presence of an electric field. The electrically conductive target may have a surface temperature. The thermo-responsive polymer solution may include a non-conductive polymer. The thermo-responsive polymer solution may have a solution temperature. The method may further include allowing the solution temperature to deviate toward the surface temperature to a deposited temperature at which the non-conductive polymer is immobile. The method may further include allowing the non-conductive polymer to accumulate on the electrically conductive target to form a layer, having a thickness sufficient to repulse the incident spray.

According to various embodiments, the layer may have a spherical shell surface morphology. The spherical shell surface morphology may include a plurality of spheroidal particles comprising the non-conductive polymer, wherein each of the plurality of spheroidal particles has at least one dimension, for example, a length, a width, a height, and/or a diameter, less than 100 micrometers.

According to various embodiments, allowing the solution temperature to deviate toward the surface temperature to the deposited temperature at which the non-conductive polymer is immobile may prompt a spinodal decomposition of the thermo-responsive polymer solution. Spinodal decomposition of the thermo-responsive polymer solution may result in the layer having a nanowire surface morphology. The nanowire surface morphology may include a plurality of elongated strands comprising the non-conductive polymer, wherein each of the plurality of elongated strands has at least one dimension, for example, a length, a width, a height, and/or a diameter, less than 100 micrometers. To achieve spinodal decomposition, the deposited temperature may be greater than a lower critical solution temperature of the thermo-responsive polymer solution. The deposited temperature may be less than an upper critical solution temperature of the thermo-responsive polymer solution.

According to various embodiments, the thermo-responsive polymer solution further may include a plurality of filler particles. The filler particles may be conductive filler particles or non-conductive filler particles. The method may further include thermally densifying the layer to at least partially remove the non-conductive polymer to form a continuous network of the conductive filler particles. The layer may have a particle volume content of from about 5 to about 99 percent, or from about 50 to about 99 percent. Each of the plurality of filler particles may have at least one dimension, for example, a length, a width, a height, and/or a diameter, less than 100 micrometers.

According to various embodiments, the non-conductive polymer may be poly(N-isopropylacrylamide) and/or methylcellulose. According to various embodiments, particularly embodiments wherein the thermo-responsive polymer solution is a lower critical solution temperature solution, the thermo-responsive polymer solution may further include water.

Various embodiments relate to a three-dimensional structure conformally-coated with a thin film or layer, the thin film comprising a non-conductive polymer and a plurality of conductive filler particles. The non-conductive polymer may be in the form of a plurality of elongated strands, wherein each of the plurality of elongated strands may have at least one dimension, for example, a length, a width, a height, and/or a diameter, less than 100 micrometers. The non-conductive polymer may be in the form of a plurality of spheroidal particles comprising the non-conductive polymer, wherein each of the plurality of spheroidal particles may have at least one dimension, for example, a length, a width, a height, and/or a diameter, less than 100 micrometers. The non-conductive polymer may be at least partially densified and wherein the plurality of conductive filler particles may form a continuous, conductive network.

Various embodiments relate to a three-dimensional structure, conformally-coated with a thin film, the thin film comprising a non-conductive polymer and a plurality of conductive filler particles. The three-dimensional structure, conformally-coated with a thin film, may be made by a process including exposing the three-dimensional structure to an incident spray comprising a thermo-responsive polymer solution, in the presence of an electric field. The three-dimensional structure may have a surface temperature. The thermo-responsive polymer solution may include a non-conductive polymer. The thermo-responsive polymer solution may have a solution temperature. The three-dimensional structure, conformally-coated with a thin film, may be made by a process further including allowing the solution temperature to deviate toward the surface temperature to a deposited temperature at which the non-conductive polymer is immobile. Allowing the solution temperature to deviate toward the surface temperature to the deposited temperature at which the non-conductive polymer is immobile may prompt a spinodal decomposition of the thermo-responsive polymer solution. The three-dimensional structure, conformally-coated with a thin film, may be made by a process further including allowing the non-conductive polymer to accumulate on the three-dimensional structure to form a thin film, having a charge sufficient to repulse the incident spray, until the three-dimensional structure is conformally-coated with the thin film.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Many aspects of this disclosure can be better understood with reference to the following figures, in which:

FIG. 1 is an example according to various embodiments illustrating a flow chart of a thickness-limited self-limiting spray (SLED) electrospray deposition (ESD) method;

FIG. 2A is an example according to various embodiments illustrating a schematic diagram of thickness-limited ESD;

FIG. 2B is an example according to various embodiments illustrating a chart of the central thickness of a deposited layer as a function of time for polystyrene (PS) sprayed from butanone at 35° C., 70° C., and 100° C., as compared to a charged melt spray of Kraton block copolymer at 35° C. (Hexion);

FIG. 3 is an example according to various embodiments illustrating an angled scanning electron microscope image of fractured shells resulting from 35 k MW PS-butanone spray at high flow rate;

FIG. 4A is an example according to various embodiments illustrating a radially-symmetric FEM simulation of electric field lines for ESD targeted at a hole in a metal film;

FIG. 4B is an example according to various embodiments illustrating a radially-symmetric FEM simulation of electric field lines for ESD targeted at a hole in a metal film, with the same conditions as FIG. 4A, but with a 2 mm hole that shows field lines avoiding the hole;

FIG. 4C is an example according to various embodiments illustrating a chart of PS-butatone thickness inside of a vice after 8 mg PS spray mass as a function of the vice gap shown in a semilog scale, with logarithmic fit as guide to the eye;

FIG. 5 is an example according to various embodiments illustrating a photograph of coatings applied to 3D objects with microscale thicknesses;

FIG. 6A is an example according to various embodiments illustrating a method and device for post-print spray of a 4D structure made of responsive materials;

FIG. 6B is an example according to various embodiments illustrating a method utilizing both a spraying device and a printing device for simultaneous nozzle print and spray coating for pre-programming spatially-varied bulk and surface properties;

FIG. 7 is an example according to various embodiments illustrating both a spraying device and a printing device for simultaneous nozzle print and spray coating for pre-programming spatially-varied bulk and surface properties demonstrating print with the sprayer "on" and "off" as indicated by coloration in the printed part;

FIG. 8 is an example according to various embodiments illustrating a gelatin structure made through the process shown in FIG. 7 cut open to reveal internal coating;

FIG. 9 is an example according to various embodiments illustrating a schematic, cross-sectional diagram of a spray print device and method;

FIG. 10 is an example according to various embodiments illustrating a block diagram of a computer system upon which various embodiments may be implemented;

FIG. 11 is an example according to various embodiments illustrating a conformal spray chamber including two sprayers, one high voltage supply, xerogel and activated carbon filtration, a heated stage, an infrared lamp, and computer control with custom software; and FIG. 12 is an example according to various embodiments illustrating a chip set upon which various embodiments may be implemented.

It should be understood that the various embodiments are not limited to the examples illustrated in the figures.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein, the term "additive manufacturing" refers to the industry standard term (ASTM F2792). It is usually defined as the process of joining materials to make objects from 3D model data, usually layer upon layer, as opposed to subtractive manufacturing methodologies. 3D printing is a type of additive manufacturing. The term "3D printing" is also used widely to refer to various additive manufacturing methods, so the term "3D printing" has some generality too.

As used herein, the term "thickness-limited" in the context of electrospray deposition refers to an electro spraying procedure where the accumulation of charge on a target repels further spray.

As used herein, the term "thermo-responsive polymer solution" refers to a polymer solution capable of undergoing decomposition into solvent-rich and polymer-rich phase through mechanisms including evaporation or spinodal decomposition.

As used herein, the term "non-conductive polymer" refers to any electrically insulating thermoplastic polymer, thermosetting polymer, copolymer, or blend, such that a rate of charge movement is much less than a rate of polymer deposition during electrospray. In the case of copolymers or blends, the individual components of the copolymer or blend may not be non-conductive, but the total copolymer or blend may be non-conductive.

As used herein, the term "immobile" refers to a polymer or polymer solution in a state at which it is resistant to flow, such as a polymer or polymer solution that is at a temperature below the polymer's softening point or glass transition temperature Tg.

As used herein, the term "spherical shell surface morphology" refers to a surface textured with a plurality of spheroidal particles.

As used herein, the term "spheroidal particles" refers to granules having a generally, but not necessarily precisely, spherical shape, for example, any ellipsoid with approximately equal semi-diameters. The spheroid may have an oblate or a prolate shape or a shape that combines an oblate and a prolate shape. The spheroid may be incomplete, for example, a spherical shell with one or more holes in the surface.

As used herein, the term "at least one dimension," when used with respect to a particle or a nanowire refers to a dimension defining an overall size of the particle or nanowire, such as an overall length, width, height, and/or diameter as opposed to a dimension that does not define the overall size of the particle or nanowire, such as the size of a surface feature.

As used herein, the term "spinodal decomposition" refers to a mechanism for the rapid unmixing of a mixture of liquids or solids from at least one thermodynamic phase to form at least two coexisting phases in the absence of thermodynamic energy barriers.

As used herein, the term "nanowire surface morphology" refers to a surface textured with a plurality of nanowire structures.

As used herein, the term "nanowire" structures that have a thickness or diameter constrained to tens of nanometers or less and an unconstrained length.

As used herein, the term "lower critical solution temperature" (LCST) refers to the critical temperature below which the components of a mixture are miscible for a broad range of solute in solvent compositions.

As used herein, the term "upper critical solution temperature" (UCST) refers to the critical temperature above which the components of a mixture are miscible for a broad range of solute in solvent compositions.

As used herein, the term "thermally densifying" refers to heating a polymer, copolymer, or blend, to a temperature above its glass transition temperature or above its melting point to liberate entrained gases, to coalesce the polymer, copolymer, or blend, and optionally to remove at least a portion of the polymer, copolymer, or blend material.

As used herein, the term "particle volume content" refers to the concentration of a particle by volume of all constituents of a mixture or system.

One of the longest-standing engineering challenges is the problem of wasted material mass. One example is in the field of coatings, where for many applications, including protective (e.g. anti-fouling, anti-corrosion, anti-static, and ultraviolet (UV) barrier) and active (e.g. catalytic and sensing) coatings, only the thin, top-most layer is necessary for the functionality. This can be especially problematic when high-efficiency nanomaterials or other advanced materials are employed in the coatings, resulting in significant unused materials cost.

Electrospray deposition (ESD) is one of a family of electrostatically-driven materials deposition processes wherein a high voltage electric field (typically >100 kilovolts per meter, kV/m) is used to create fluid droplets or extruded wires. ESD describes conditions where dilute (typically <5 vol %) spray solutions are placed under an electric field while being emitted through a narrow capillary. The field creates charge on the surface of the fluid that in turn draws the fluid into a Taylor cone which emits droplets. These charged droplets split into a size where surface and electrostatic forces are balanced in one or several generations of droplets of narrow dispersion. As each of these droplets arrive at a grounded or opposite polarity target, it delivers the material contained within, depositing a coating of material.

Various embodiments relate to self-limiting ESD (SLED), which describes a regime of spray wherein the spray target is electrically conductive, where "electrically conductive" in this context refers to possessing sufficient conductivity to remove charge at an equal or greater rate than it is being delivered by the spray, and the spray itself is both (1) electrically non-conductive, where "non-conductive" in this context refers to possessing electrical conductivity insufficient to dissipate the charge at a rate equal to or greater than the rate delivered by the spray, and (2) immobile, where "immobile" in this context means unable to flow at a rate comparable to the time scale of spray. In this regime charge builds up on the surface of the coating and leads to repulsion of the incident spray, which is redirected to uncoated portions of the target. This property enables coatings of complex 3D surfaces with an unprecedented level of uniform thickness of the coating.

Various embodiments disclosed here relate to a thickness-limited self-limiting electrospray deposition (SLED) variation of electrospray deposition (ESD) method as a means to fabricate microscale functional coatings. Various embodiments of this method make use of charge buildup in ESD to redirect sprays to uncoated regions of the target. In this way, the coatings may track the target surface in a conformal fashion, and since the sprays do not require vacuum or immersion in a bath, they can be deposited in ambient conditions. According to various embodiments, these unique advantages may be used to provide scalable methods and devices that may produce complex three-dimensional (3D) additive or micromachined structures. The methods and devices may result in a significate reduction in material waste.

Various embodiments provide additive manufacturing techniques according to which the deposited material tracks the target surface in a conformal fashion. These embodiments make the additive manufacturing process inherently more efficient. Efficiency improvements include a reduction in material waste. Since, according to various embodiments, the deposited material is only on the surface of the printed structure less material may be required to provide the desired properties. Additionally, since the deposited material may be redirected to uncoated regions during the additive manufacturing process, less material is wasted.

Various embodiments provide methods and devices for thickness-limited electrospray additive manufacturing. The methods and devices according to such embodiments incorporate self-limiting electrospray deposition (SLED) into 3D printing or additive manufacturing. These embodiments make the additive manufacturing process inherently more efficient. Efficiency improvements include decreased manufacturing time by the elimination of steps as well as a reduction in material waste. These embodiments also impart desirable benefits to the manufactured item not otherwise obtainable, including but not limited to an improved coating uniformity.

Various embodiments provide methods and devices for thickness-limited electrospray additive manufacturing. The methods and devices according to such embodiments incorporate self-limiting electrospray deposition (SLED) into 3D printing or additive manufacturing. These embodiments make the additive manufacturing process inherently more efficient. Efficiency improvements include decreased manufacturing time by the elimination of steps as well as a reduction in material waste. These embodiments also impart desirable benefits to the manufactured item not otherwise obtainable, including but not limited to an improved coating uniformity.

Various embodiments provide methods and devices that incorporate self-limiting electrospray deposition into additive manufacturing as either a post-processing method to coat films on 3D printed structures or a simultaneous print-and-coat approach where the spray coats the printed device with a uniform coating as it is printed. Such embodiments may provide various functional coatings, including, but not limited to: anti-corrosion barriers, anti-fouling films, photoactive films, mechanically active films, porous coatings, and combinations thereof. Various embodiments provide sprays that can cover complex 3D surfaces with porous polymer coatings. The densified thickness of these coatings can be as low as about 1 µm, which is well below the resolution of most additive manufacturing techniques. Such embodiments provide the first spray approach that is compatible specifically with 3D objects, as well as the first spray approach that may be implemented in-situ during the printing. Other advantages and applications include adding corrosion barriers to metal components produced by additive manufacturing, adding anti-inflammatory or other medicines to medical implants produced by additive manufacturing, toughening the interface of fused deposition modeling (FDM) printed parts. Furthermore, other more exploratory applications exist, including but not limited to sensing and catalysis, such as adding highly active catalytic nanoparticles to printed scaffolds.

Various embodiments may achieve high-efficiency application of nanotextured coatings with multifunctional additives at desired microscale thicknesses. To accomplish these objectives, various embodiments leverage the mechanisms of charge redistribution and self-assembly that occur in this highly-dynamic process. Four mechanisms are employed, alone or in some combination, in various embodiments: (1) the phase behavior of evaporating ESD droplets of homogeneous or blended polymer solutions; (2) the changes to this phase behavior with the addition of conductive and non-conductive particles; (3) the effects of substrate conductivity on the ability to spray SLED coatings, and (4) the effects of different 3D geometries and their resulting limitations.

Various embodiments recognize that the capability to deposit precise micro/nanoscale coatings onto 3D surfaces with control over the morphology in a non-bath or non-vacuum method would represent a huge cost savings for these coatings and electrostatically-induced sprays have the potential to fill this need. ESD and electrostatic spray processing both generate highly monodisperse droplets or powder sprays through the acceleration of particles in a strong electric field (~100 kV/m). The key difference between ESD and commercial electrostatic spray is the nature of the charge transfer and motion. In electrostatic spray, moving ionized air is used to charge and direct the spray, while in ESD, the electrostatic force on the droplet is the only driver for transport. Despite having been studied for several decades, results of ESD are notoriously difficult to reproduce, and the deliberate use of the electrostatic instabilities observed in electrostatic spray to control ESD has been quite limited.

FIG. 1 is a flow chart that illustrates an example of thickness-limited self-limiting electrospray deposition (SLED) variation of electrospray deposition (ESD) method according to various embodiments. Referring to FIG. 1, various embodiments relate to a method of thickness-limited, electrospray deposition 100. The method 100 may include a step 101 of exposing an electrically conductive target to an incident spray comprising a thermo-responsive polymer solution, in the presence of an electric field.

The electrically conductive target may have a surface temperature in a range of from about 0 to about 200 degrees Celsius (° C.).

The thermo-responsive polymer solution may include a polymeric component. The polymeric component may be a polymer, co-polymer, or a blend or a mixture thereof. The polymer may be a non-conductive polymer. Any non-conductive polymer may be employed. According to certain embodiments, the non-conductive polymer may be poly (ethylene), poly(styrene), poly(silsesquioxane), poly(methyl methacrylate), poly(vinyl pyrrolidone), poly(N-isopropylacrylamide), poly(N,N-diethylacrylamide), poly(N-vinylcaprolactam), poly(ethylene oxide), poly(vinyl alcohol), poly(tetrafluoroethylene), poly(acrylic acid), dextran, poly (propylene oxide), poly(pentapeptide) of elastin, poly(dimethylamino ethyl methacrylate), poly(N-(L)-(1-hydroxymethyl)propylmethacrylamide), poly(oxazoline)s, poly (propylene), methylcellulose, silk, polysaccharides, gelatin, or agarose. Potential blends or copolymer components not listed above may be liquid polymers. According to certain embodiments, liquid polymers may be DNA, poly(ethylene glycol), poly(isoprene), poly(butadiene), poly(vinyl methyl ether), poly(dimethyl siloxane), or epoxies. The polymeric component may be present in an amount of from about 0.01 to about 10 percent by weight based on the total weight of the thermo-responsive polymer solution. The solvent component must be compatible with the polymeric component and the electrospray process. The solvent component may be a pure solvent, or blends, or solvents with molecular additives, such as dyes, salts, surfactants, or pharmaceutical compounds. According to certain embodiments, the solvent may be water, alcohols, 2-butanone, acetone, ethyl acetate, alkanes, cycloalkanes, ethers, xylene, toluene, dimethylformamide, dimethyl sulfoxide, chloroform, chlorobenzene, dichlorobenzene, dichloroethane, trichlorobenzene, chlorofluorocarbons, or fluorinated oils.

The thermo-responsive polymer solution may have a solution temperature in a range of from −200 to 1000 degrees Celsius, or in a range of from −50 to 200 degrees Celsius, or in a range of from 0 to 100 degrees Celsius.

Still referring to FIG. 1, the method 100 may further include a step 102 of allowing the solution temperature to deviate toward the surface temperature to a deposited temperature at which the non-conductive polymer is immobile. The deviation from the solution temperature toward the surface temperature may include heating or cooling of the thermo-responsive polymer solution. The thermo-responsive solution may be heated or cooled due to environmental conditions within an electro spraying apparatus and/or due to contact with the target and/or due to contact with material, such as due to the non-conductive polymer accumulating on the target.

Still referring to FIG. 1, the method 100 may further include a step 103 of allowing the non-conductive polymer to accumulate on the electrically conductive target to form a layer, having a thickness or a charge sufficient to repulse the incident spray. The thickness required to repulse the incident spray may vary based on the materials employed, but, in general, the thickness may be in a range up to less than about 1 mm, less than about 100 micrometers, less than about 10 micrometers, less than about 1 micrometers, or less than about 0.1 micrometers.

According to various embodiments, the layer may have a spherical shell surface morphology. The spherical shell surface morphology may include a plurality of spheroidal particles comprising the non-conductive polymer, wherein each of the plurality of spheroidal particles has at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. These particles also possess shell thicknesses less than about 10 micrometers, less than about 1 micrometers, less than about 0.1 micrometers, less than about 0.01 micrometers, or less than about 0.001 micrometers.

According to various embodiments, the step 102 of allowing the solution temperature to deviate toward the surface temperature to the deposited temperature at which the non-conductive polymer is immobile may prompt a spinodal decomposition of the thermo-responsive polymer solution. Spinodal decomposition of the thermo-responsive polymer solution may result in the layer having a nanowire surface morphology. The nanowire surface morphology may include a plurality of elongated strands comprising the non-conductive polymer, wherein each of the plurality of elongated strands has at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. To achieve spinodal decomposition, the deposited temperature may be greater than a lower critical solution temperature (LCST) of the thermo-responsive polymer solution. Alternatively, or in addition, the deposited temperature may be less than an upper critical solution temperature (UCST) of the thermo-responsive polymer solution.

Prior to the present invention, LCST materials were not processable by existing methods. There was no way to deliver microscale coatings of engineered materials onto 3D objects in ambient conditions, preventing the integration of nanotechnology into a host of commercial applications.

According to various embodiments, the thermo-responsive polymer solution further may include a plurality of filler particles. The filler particles may be conductive filler particles or non-conductive filler particles. Referring again to FIG. 1, the method 100 may further include, after thickness-limited deposition, a step 104 of thermally densifying the layer to remove air voids and an optional step of at least partially removing the non-conductive polymer to form a continuous network of the conductive filler particles. The layer may have a particle volume content of from about 50 to about 90 percent, of from about 60 to about 80 percent, or about 70 percent. Each of the plurality of filler particles may have at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers.

According to various embodiments, particularly embodiments wherein the thermo-responsive polymer solution is a lower critical solution temperature (LCST) solution, the thermo-responsive polymer solution may further include water.

Various embodiments relate to a three-dimensional structure conformally-coated with a thin film, the thin film comprising a non-conductive polymer and a plurality of conductive filler particles. The three-dimensional structure, conformally-coated with a thin film, may be made by a process as described in other embodiments. The non-conductive polymer may be in the form of a plurality of elongated strands, wherein each of the plurality of elongated strands may have at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. The non-conductive polymer may be in the form of a plurality of spheroidal particles comprising the non-conductive polymer, wherein each of the plurality of spheroidal particles may have at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. The non-conductive polymer may be at least partially densified and wherein the plurality of conductive filler particles may form a continuous, conductive network while retaining the controlled thickness imparted by the deposition process.

Various embodiments provide the ability to deposit minimal coatings comprised of multifunctional materials. SLED can potentially be employed with a wide variety of functional coatings including chemical, electrical, or thermal barrier coatings, electrically or thermally conductive coatings, piezoelectric coatings, and reactive, energetic, or antimicrobial coatings. Compared to millimeter-scale coatings currently employed, microscale coatings represent a materials reduction of 2 to 3 orders of magnitude. Such a reduction reduces both mass and cost. Further, multiple of these functionalities can be included in the same composite coating, potentially reducing the need for layered applications.

The ability to deposit these coatings without the need for vacuum or fluid bath gives SLED a huge cost advantage over other conformal methods. Simultaneously, the conformal nature of SLED, as compared to other spray techniques, reduces the complexity of the application process, because neither the target nor the sprayer needs to be moved to coat complex or even reentrant surfaces. In this way, components such as gantries or robotic arms can be removed and replaced with assembly line spray. Various embodiments also allow for targeted repair of these coatings down to microscale flaws without reapplication of the coating or addition of material to undamaged areas. For example, in embodiments where the final coating surface is non-conductive, charge can be applied to the top surface by a solids-free spray, and then a thickness-limited spray of the same charge can be used to target exposed regions. Another example is where the final surface of the coating is conductive, but there exists a non-conductive layer between it and the target surface. Here the top surface can be held by a voltage source to an elevated charge such that once again, sprays of the same charge will target exposed regions. This represents a large opportunity for reduction of both materials use and regeneration of coatings without replacement. Indeed, by eliminating the need to know the location of damage, repair can be conducted via routine reapplication by human personnel or even drones for hard-to-access areas.

Various embodiments provide (1) the ability to control the micro/nanoscale morphology and porosity of sprayed polymer coatings for applications, including applying coatings as thermal barriers; (2) SLED sprays that can be deposited from non-toxic aqueous solutions at ambient temperatures and humidity; (3) the addition of materials that would be otherwise incompatible with SLED through blending, such as functional polymers or nanoparticles as anti-fouling, anti-static, or active layers; or (4) coating of 3D non-conductive structures that would normally be considered incompatible with ESD, including native oxides of metallic surfaces, which reduces the need for pretreatment; or some combination.

In ESD, the droplets are emitted by electrostatic breakdown from an electrostatically drawn Taylor cone. ESD tends to use much lower flow rates (on the order of ~1 milliliter per hour, mL/hr) and exclusively makes use of low solids loadings (generally <5 vol %). Higher solids loadings result in a third technique, electrospinning, which is commonly employed in the production of fiber mats. When DC electric fields are employed, the droplets produced in the initial separation from the Taylor cone in ESD continue to split until they achieve a balance of surface tension and surface charge, with the crossover referred to as the Rayleigh limit. In the process, they undergo repeated Coulomb explosion events, ejecting monodisperse "child" droplets. As the solvent in the parent and child droplets evaporates, they eject additional generations of droplets until the spray arrives at a substrate or the solids fraction gels the droplets. This cascading process, most typically two generations, results in a finite collection of monodisperse final particle sizes. The dominant size of these droplets (typically ~0.1 to ~100 μm) can be described through the following empirical relationship shown in Equation (1):

$$d = \alpha \left( \frac{Q^3 \varepsilon_0 \rho}{\pi^4 \sigma \gamma} \right)^{\frac{1}{6}} + d_0 \quad (1)$$

Where $\alpha$ is a constant related to the fluid's dielectric permittivity, Q is the flow rate, $\varepsilon_0$ is the permittivity of vacuum, $\rho$ is the density of solution, $\gamma$ is the surface tension of the solution, $\sigma$ is the electrical conductivity of the solution, and $d_0$ is a relatively small diameter that comes into play only at low flow rates. This monodisperse generation of self-repelling droplets is a major advantage of ESD, along with the ease of creating nanocomposites via simple mixing. As a result, ESD may be employed for deposition of nanomaterials. These capabilities make ESD ideal for the deposition of nanomaterials including proteins and cells, thin polymeric and chalcogenide films, ceramic precursors, and nanoparticles.

Because of the charged nature of the droplets, ESD of continuous films requires continuous dissipation of the delivered charge. Therefore, there is an inherent contradiction to spraying insulating coatings onto conductive surfaces, since even a thin layer of insulator should "clad" the conductive surface and stop the spray in a "thickness-limited" fashion.

To access the thickness-limited SLED regime, the polymer-loaded droplets, in which the polymer is insulating in nature, arrive in an immobile state or rapidly become immobile at the surface of the substrate, such as to not allow the polymer to flow and thus produce interfacial charge transport. These immobile polymer-rich droplets or particles create a loosely-connected porous film that can be densified by heat treatment as with other powder sprays. It should be noted that these droplets/particles can be slightly fused together by the solvent, diminishing the powder losses observed in SLED electrostatic spray. In this way, the newly-arriving spray is repelled by particles that previously arrived. FIG. 2A is a schematic that illustrates an example of thickness-limited ESD according to various embodiments. FIG. 2A shows a charged film or layer 20 deposited on a substrate 18 that has been exposed to an electrostatically-driven spray comprising a plurality of droplets 16 following paths 14, in an electric field created by a voltage 22 between the substrate 18 and an electrospray deposition apparatus 10. The droplets 16 have charges 12 and are repelled by like-charges 13 on the deposited layer 20 to be redirected to uncoated portions of the substrate 18. In this way, the thickness of film 20 is self-limited, because the electrostatically-driven spray leads to a charged film 20 that redirects charged droplets 16 incident on the same substrate 18. In some embodiments, one or more components are controlled by a controller 201. In various embodiments, a computing system 1000 depicted with reference to FIG. 10 or chip set 1200 depicted with reference to FIG. 12, below, serves as controller 201.

According to various embodiments, parameters such as temperature, flow rate, and solids loading may be utilized to influence thickness-limited SLED. Polymer films of ~2 to ~4 μm may be obtained with a high degree of process repeatability. For example, as illustrated in FIG. 2B, PS in butanone (PS-butanone) and oligomeric sol gel-butanone solutions may be employed and adjusted via parameters such as spray time, temperature, flow rate, and solids loading.

FIG. 2B is a chart that illustrates an example of the central thickness of a deposited layer as a function of time for polystyrene (PS) sprayed from butanone at 35° C., 70° C., and 100° C., as compared to a charged melt spray of Kraton D1102 (Hexion) block copolymer according to various embodiments. SLED behavior is evident in the lower-temperature sprays at an onset of ~4 mg.

To obtain functional morphologies for target coatings, various embodiments utilize the mechanisms creating the diverse behaviors already displayed in SLED particularly with regards to (1) phase separation-altered and compositionally-altered mobility and (2) self-assembly of non-conductive and conductive particles under the electrostatic and hydrodynamic forces of evaporating ESD droplets.

Various embodiments employ the morphology formed by the droplets during drying to form thickness-limited coatings. At least two characteristic geometric families may be achieved: (1) spheroidal (e.g. circles, ellipsoids, and partial/complete shells) and (2) linear (e.g., wires). These structures arise from a combination of the electrostatic, hydrodynamic, and thermodynamic driving forces within the evaporating droplet. For purposes of explanation the following theories are provided; but the embodiments are not limited by the accuracy or completeness of these theories.

It appears that the observed morphologies can be understood as arising from heterogeneous (rounded) and homogeneous (linear) phase separation respectively. Applying this understanding to microscale droplets under strong electrostatic fields allows various embodiments to control the morphology and thereby the properties of the final coatings.

According to various embodiments the deposited films may have a spherical shell surface morphology. For example, in the case of the PS-butanone sprays, the microstructure of the coatings may include a plurality of spherical shells. This microstructure may be understood by the evolution in phase space of a conventional evaporating polymer solution, which gradually progresses from a solvent-rich single phase through a two-phase region at the surface, heterogeneously generating a skin of polymer-rich phase that acts to immobilize the droplet, preventing charge reconfiguration.

FIG. 3 shows angled scanning electron microscope (SEM) images of characteristic spray results, according to various embodiments at different spray compositions. FIG. 3 is an angled scanning electron microscope image that illustrates an example of spheroidal particles 300, such as fractured shells resulting from 35 k MW PS-butanone spray at high flow rate according to various embodiments. The specific example is: flow rate 1.5 mL/hr, temperature 35° C., 1 wt % 35 k MW PS in 2-butanone.

FIG. 4A is a radially-symmetric FEM simulation that illustrates an example of electric field lines for ESD targeted at a hole in a metal film according to various embodiments. At these conditions (6 kV/cm field and 6 microCoulombs per square meter, μC/m2 of charge), a 6 millimeter, mm, hole results in the field lines contacting the side wall of the hole, suggesting that spray would coat the interior surface. FIG. 4B is a radially-symmetric FEM simulation that illustrates an example of electric field lines for ESD targeted at a hole in a metal film according to various embodiments. The same conditions as FIG. 4A, but with a 2 mm hole that shows field lines avoiding the hole. This suggests that the interior would not be coated. In both simulations, the metal is coated with charge on the top surface. FIG. 4B is a chart that illustrates an example of PS-butatone thickness inside of a vice after 8 mg PS spray mass as a function of the vice gap shown in a semilog scale, with logarithmic fit as guide to the eye, according to various embodiments.

Coating 3D objects with microscale thicknesses demonstrates the capabilities of the thickness-limited SLED technique to follow complex surfaces. A geometry that exemplifies the limits of complexity of 3D surface that can be coated is that of a hole through a conducting plate, as preliminarily simulated in FIG. 4A and FIG. 4B. Lacking any surface charge, the ESD process will progress to the closest surface first. In this way, it is likely that the surface of the plate will be coated before the interior walls of the hole. Now, with the initial condition of the coated surface, the spray either progresses into the hole, or finds regions further along the surface to coat. Clearly, there must be a transition size where the hole goes from being the next coated region (FIG. 4A) to never being coated (FIG. 4B).

This is only one of the relevant considerations when considering the deposition. Another arises from the fact that electric fields have a tendency to focus at sharp corners, which leads to buildup of spray. Finally, as the geometries reduce in scale, the droplet size can become commensurate with the feature curvature or even the size of entries. This will result in a flow rate dependence in the ability for droplets to enter features as specified by Equation 1. Spray of polished stainless steel vice plates, as a function of reducing plate gap, (FIG. 4B) has revealed that sprays can infiltrate mm-scale gaps without change in coating thickness, but that at smaller gaps, screening effects emerge.

Applications for various embodiments include coatings of all types, lab-on-chip medicine, controlled claddings of wires, thermal insulation, anti-static surfaces, catalytic surfaces, and electrical, pressure, and chemical sensors. Controlled coating of biological agents and nanoparticles on medical implants for the delivery of therapeutic agents, anti-inflammation, mitigation of biological fouling, or enhancement of cellular growth is another key application area. In each application area, thickness-limited spray can lower wasted active material and reduce coating mass.

Various embodiments provide additive manufacturing techniques according to which the deposited material tracks the target surface in a conformal fashion. These embodiments make the additive manufacturing process inherently more efficient. Efficiency improvements include a reduction in material waste. Since the deposited material may be redirected to uncoated regions during the additive manufacturing process, less material is wasted.

Various embodiments provide methods and devices for thickness-limited electrospray additive manufacturing. The methods and devices according to such embodiments incorporate self-limiting electrospray deposition (SLED) into 3D printing or additive manufacturing. These embodiments make the additive manufacturing process inherently more efficient. Efficiency improvements include decreased manufacturing time by the elimination of steps as well as a reduction in material waste. These embodiments also impart desirable benefits to the manufactured item not otherwise obtainable, including but not limited to an improved coating uniformity.

A critical implication of accessing the thickness-limited regime is that it allows for a much greater ability to coat 3D structures with high uniformity. FIG. 5 is an example according to various embodiments illustrating a photograph of coatings applied to 3D objects with microscale thicknesses, demonstrating the capabilities of thickness-limited SLED technique to follow complex 3D surface structures.

Additive manufacturing (AM) may be employed to provide a previously unattainable level of control over the structures in three dimensions. More recently, using stimuli-responsive materials in additive manufacturing has created new opportunities to dynamically tune shapes and properties of a printed material without changing its chemical compositions. This approach has been recently termed 4D printing, with the 4th dimension being time. However, it is an inherently serial process—to integrate multi-functionality into a single 3D structure, complex processes are required to pattern the individual components, making it challenging to precisely control and program materials behaviors, particularly at the micro- and nanoscales. Meanwhile, the incorporation of active materials into the entire build can be wasteful since many functionalities, such as sensing, actuation, and optical displays, often require only a surface-level response.

Various embodiments combine self-limiting electrospray deposition (SLED), a sub-technique of electrospray deposition (ESD), and stereolithography or nozzle-based additive manufacturing (AM) of active materials. This represents a new paradigm of 3D printing, allowing seamless integration of multifunctionality and programmed active actuation and passive environmental responses, all dictated by functional surface coatings.

Figure 6A:
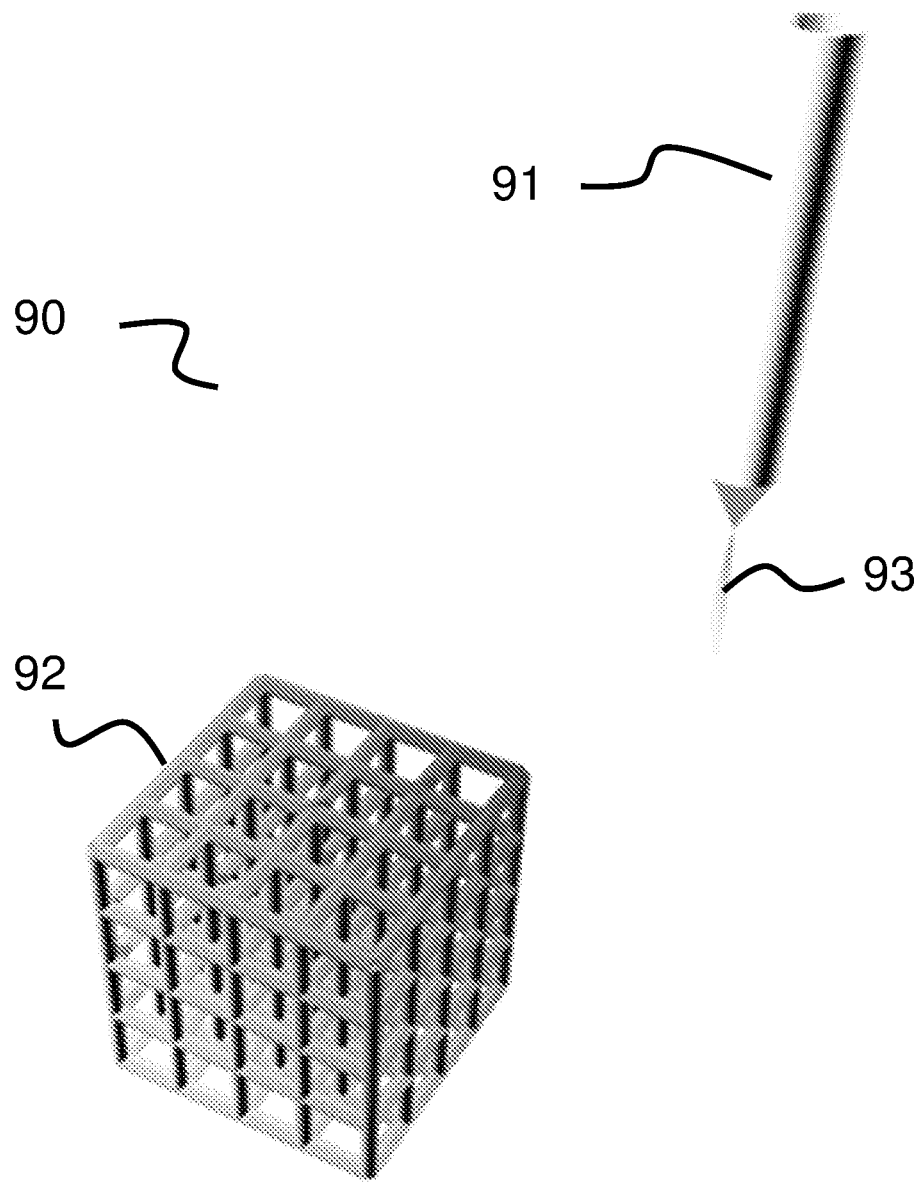

According to various embodiments self-limiting electrospray deposition (SLED) may be used after a component is manufactured using additive manufacturing techniques, such as 3D printing. As used herein, the term "print" is an abbreviation that references 3D printing specifically but is also intended to include the broader category of additive manufacturing techniques. Similarly, the term "spray" is an abbreviation that references self-limiting electrospray deposition techniques, specifically, but is also intended to include the broader category of spray deposition techniques. FIG. 6A is an example according to various embodiments illustrating a method 90 and device 91 for post-print spray of a structure 92. The device 91 may apply a spray 93 to the structure 92. The structure 92 may be a 4D structure, meaning that it could be formed of a material that changes shape in response to a stimulus, such as thermo-responsive or humidity-responsive materials, including humidity-responsive polymers as described according to various embodiments. As already described according to various embodiments the structure 92 may be coated using thickness-limited, electrospray deposition. The structure 92 may be an electrically conductive target and the method 90 may include exposing the structure 92 to an incident spray 93 comprising a thermo-responsive polymer solution, in the presence of an electric field. As described according to various other embodiments, the method 90 may further include allowing the solution temperature to deviate toward the surface temperature of the structure 92 to a deposited temperature at which the non-conductive polymer is immobile. The method may further include allowing the non-conductive polymer to accumulate on the structure 92 to form a layer, having a thickness sufficient to repulse the incident spray 93.

According to various embodiments it is desirable to maximize the ability to locally and globally control the surface-initiated responses in a 4D fashion, meaning that changing the extent or rate to which it responds in a global (applied to the whole structure) or local (applied to a specific region of the structure) fashion can increase the means with which these structures can be designed.

Figure 2A:
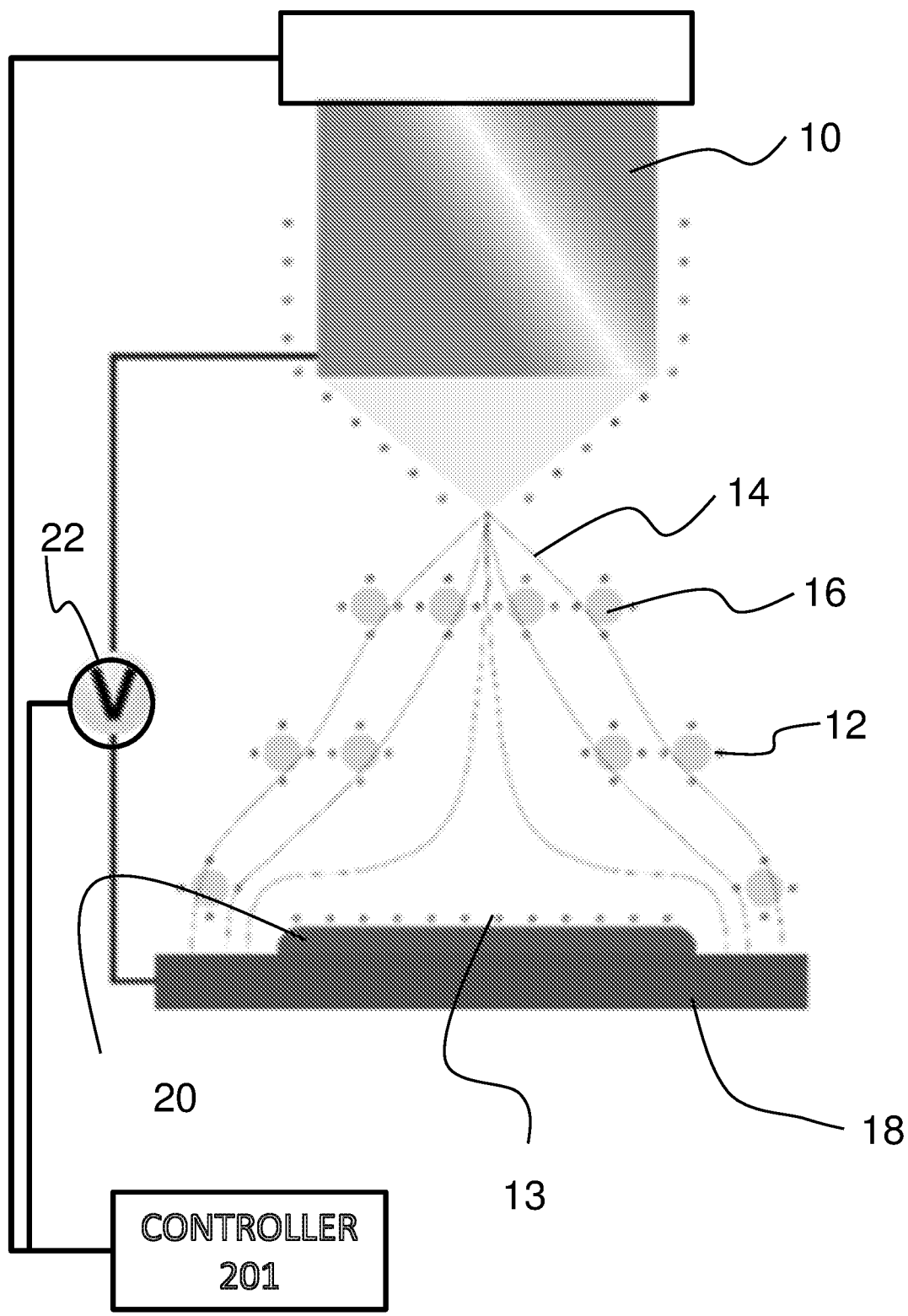
Figure 2B:
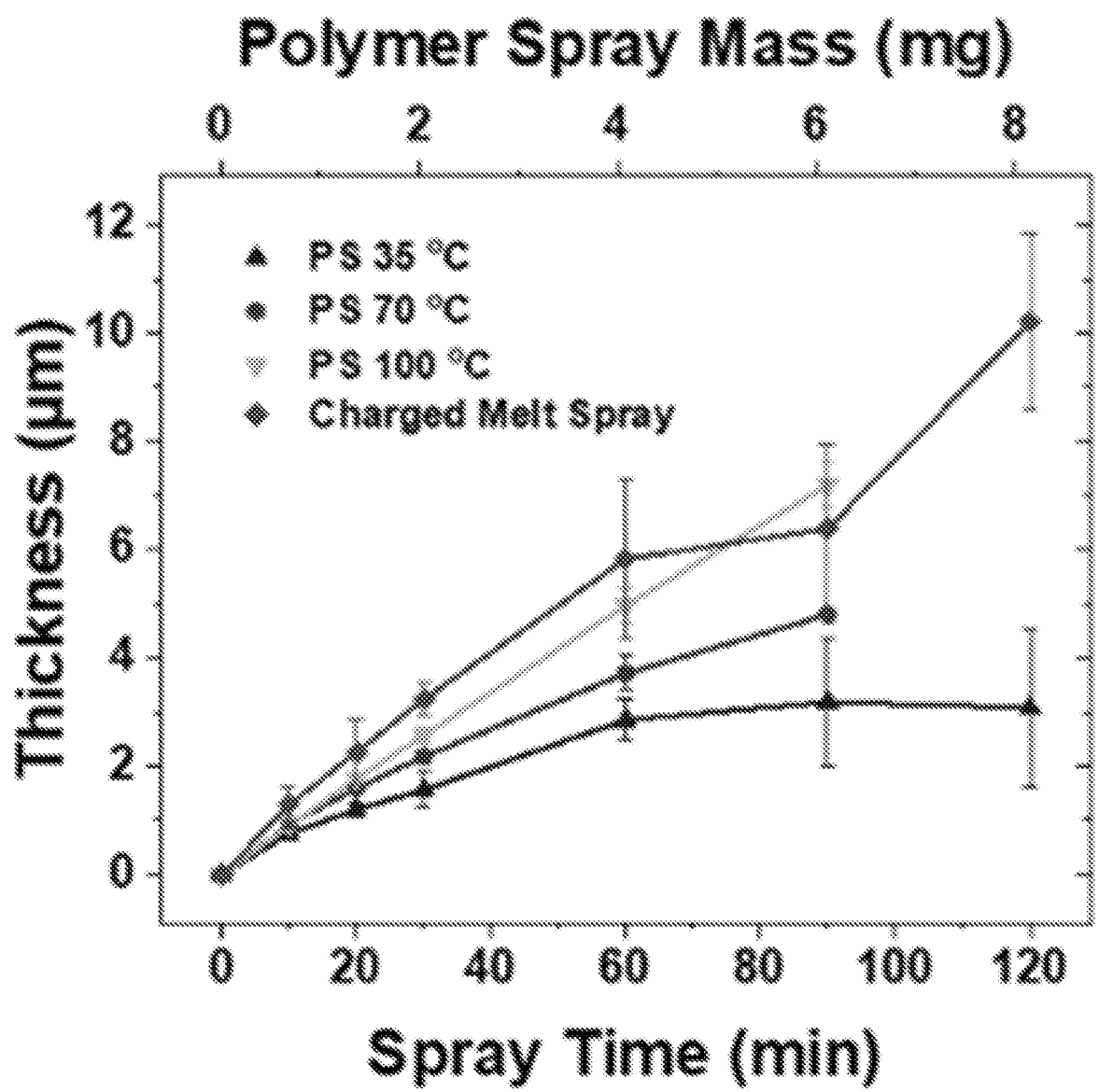
Figure 3:
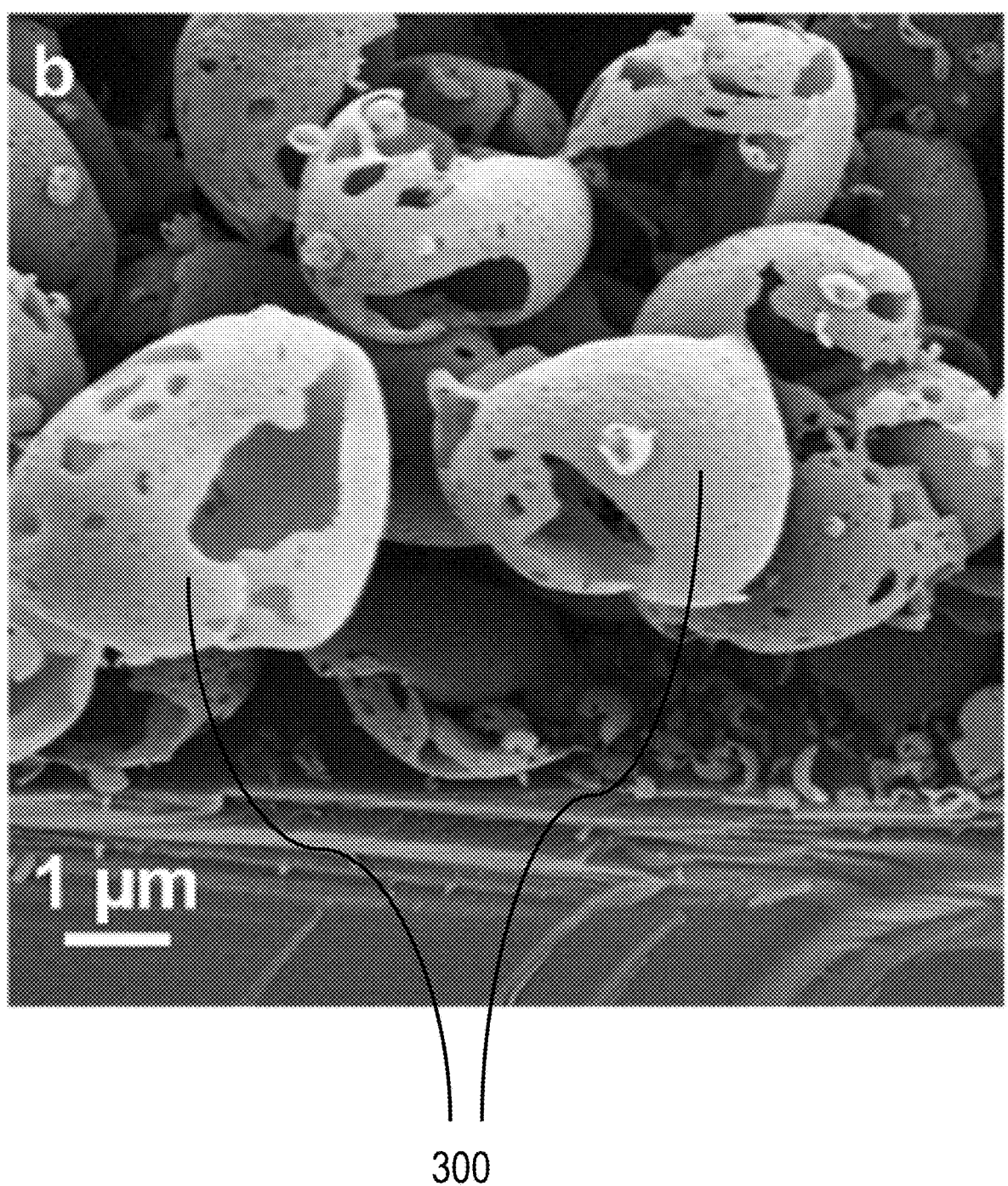
Figure 4A:
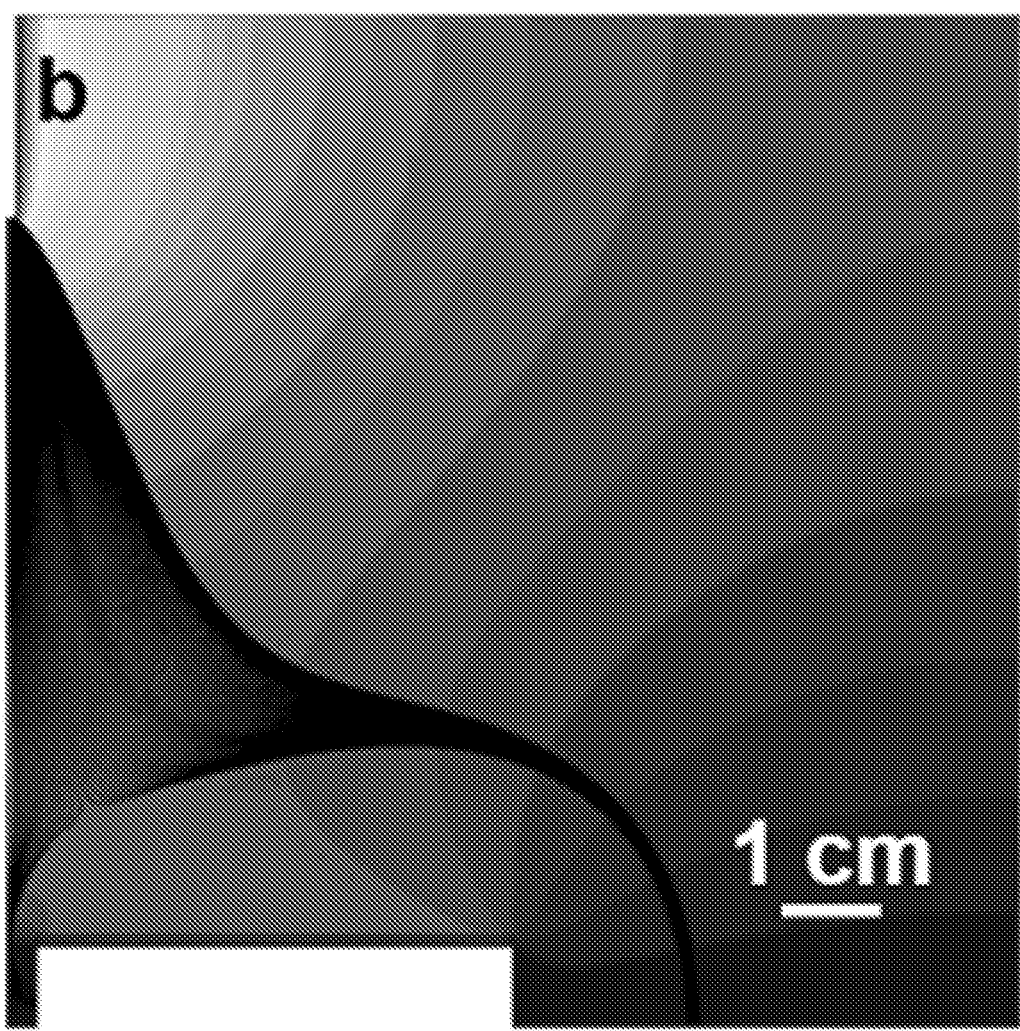
Figure 4B:
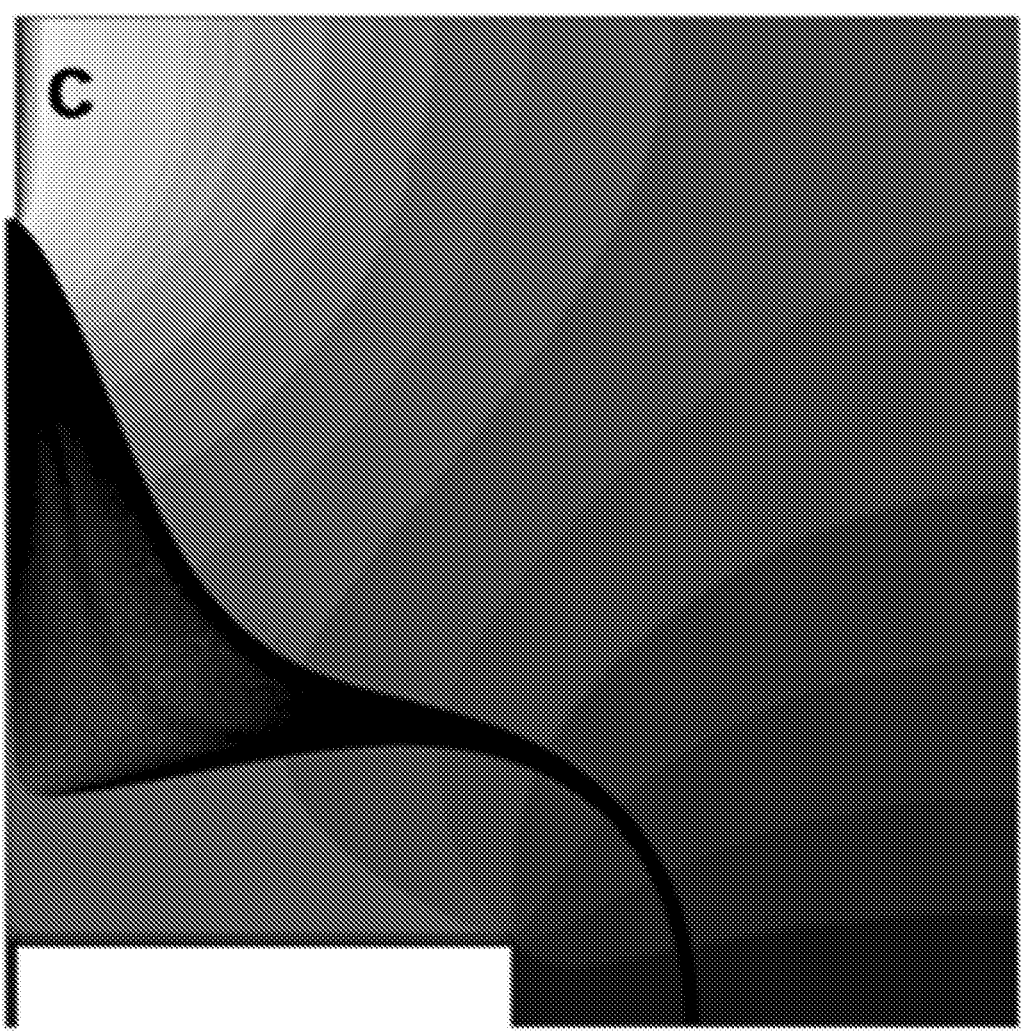
Figure 4C:
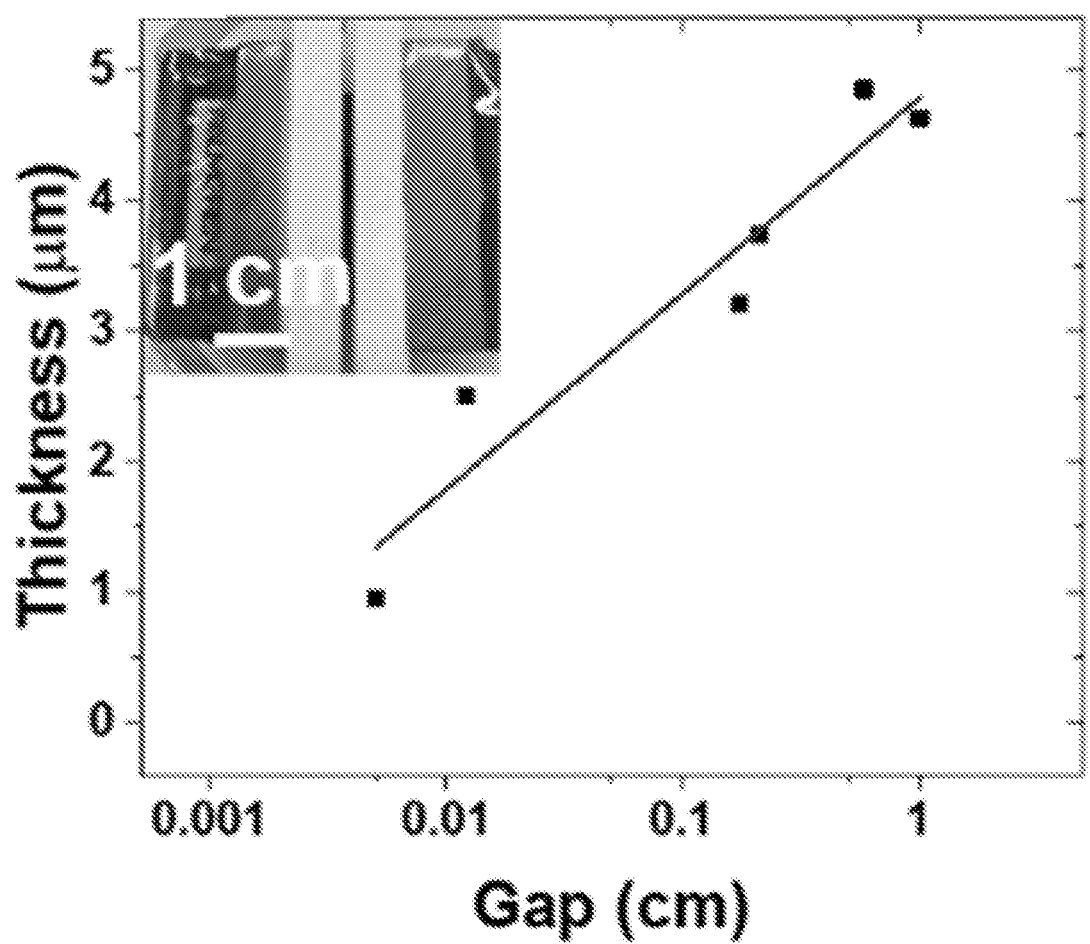
Figure 5:
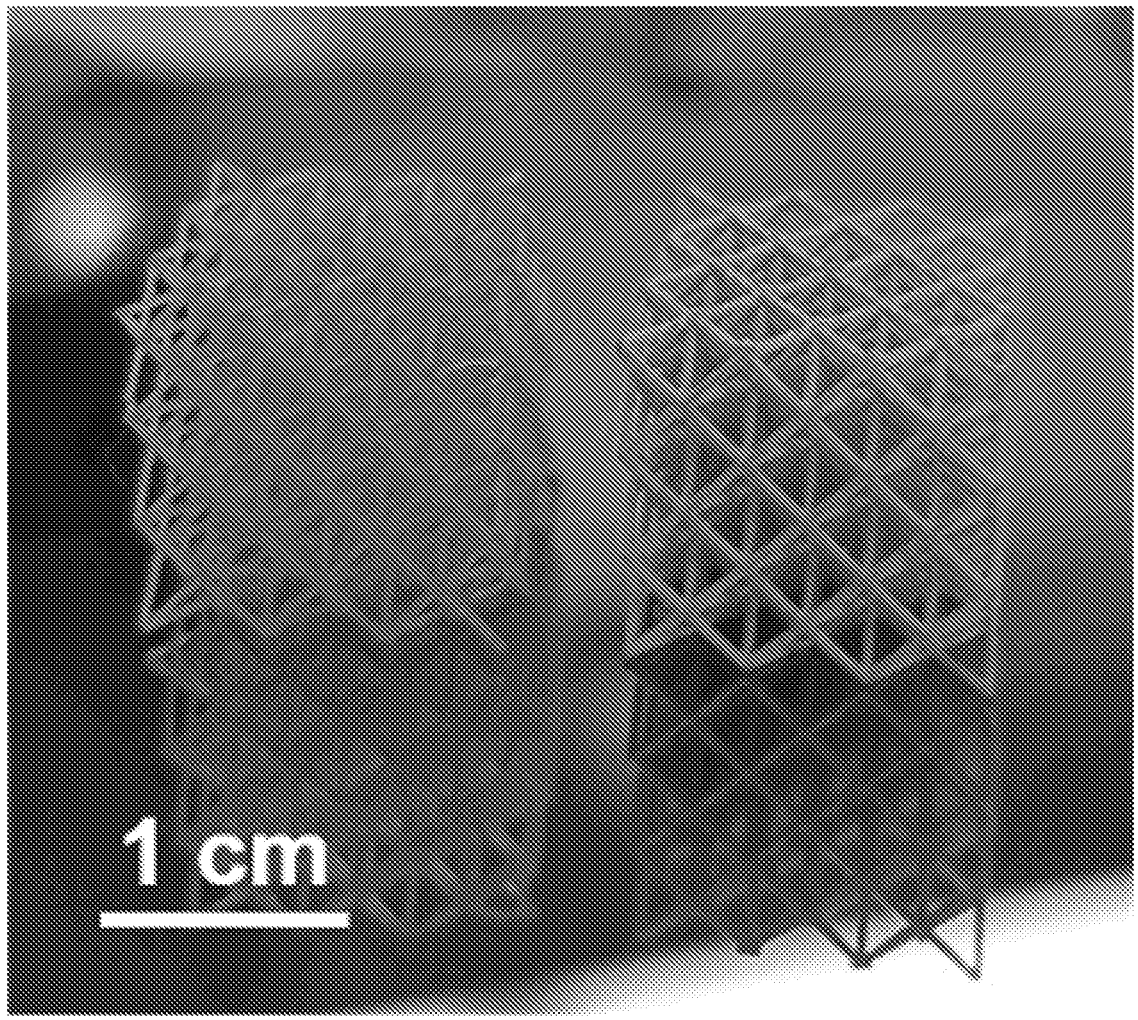
Figure 6B:
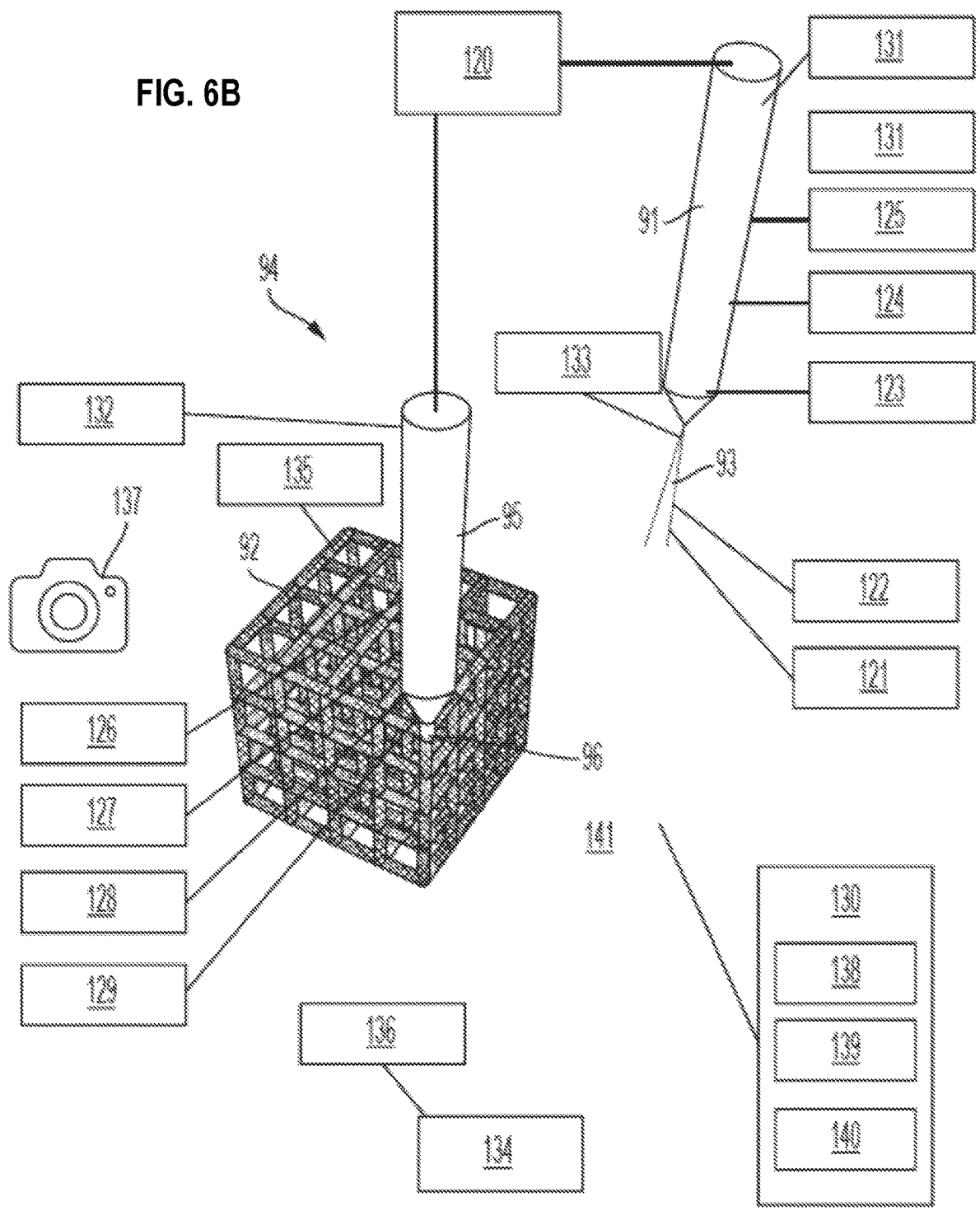

In addition to the post-print spraying device and method illustrated in FIG. 6A, various embodiments relate to simultaneous print and spray methods and devices. FIG. 6B is an example according to various embodiments illustrating a method utilizing an apparatus 94 having both a spraying device 91 and an additive manufacturing device 95 for simultaneous nozzle print and spray coating for pre-programming spatially-varied bulk and surface properties. According to the method, a component 92 may be printed from an additive manufacturing material 96 via an additive manufacturing device 95 controlled by a computing device comprising a memory and a processor such as controller 201 depicted in FIG. 2A, as is known in the art of additive manufacturing. Materials for 3D printing may include polymers, monomers, and oligomers formed thermoplastically or crosslinked with chemical additives, such as polylactic acid, acrylonitrile butadiene styrene copolymer, nylons, polyethylene terephthalate, high-density polyethylene, polycarbonate, thermoplastic urethane, poly(ethylene glocol) diacrylate (PEGDA), 1,6-hexanediol diacrylate, poly(ethylene glocol) dimethacrylate, poly acrylic acid, poly(N-isopropylacrylamide), polyacrylamide, tert-butyl acrylate, bisphenol A ethoxylate, dimethacrylate, bisphenol A ethoxylate diacrylate, benzyl methacrylate, poly(urethane) acrylate, di(ethylene glycol) dimethacrylate, gelatin, alginate, chitosan, chitosan; metals and alloys as inks powders or filaments, such as aluminum, copper, titanium, nitanol incolnel, eGaIn, Field's metal, galinstan, magnesium, silver, gold, platinum-based bulk metallic glasses, zirconium-based bulk metallic glasses, gold-based bulk metallic glasses, and Ti-6Al-4V; and ceramic powders, alumina, silica, titiania, silicon nitride, silicon carbide, barium strontium titanate, zirconia titanate, barium titanate.

As illustrated in FIG. 6B, various embodiments relate to an apparatus 94 comprising an additive manufacturing device 95, a spraying device 91, and a computing device 120 (such as computing system 1000 depicted with reference to FIG. 10 or chip set 1200 depicted with reference to FIG. 12, below) programmed to control the additive manufacturing device 95 and the spraying device 91 to perform a method of additive manufacturing and thickness-limited, electrospray deposition. FIG. 6B illustrate two coatings on the same object, which may be used, according to various embodiments. The gradient in the illustration is sharp, but the actual gradient in properties may be smoother as required by the application or dictated by technical limits. The method may be a method according to any of the embodiments described herein. For example, the method may include ejecting an electrically conductive target, comprising an additive manufacturing material 96, from the additive manufacturing device 95; exposing a first portion of the electrically conductive target to a first incident spray 93 from the spraying device 91, the first incident spray 93 comprising a thermo-responsive polymer solution, in the presence of an electric field, wherein the electrically conductive target has a surface temperature, wherein the thermo-responsive polymer solution comprises a non-conductive polymer, wherein the thermo-responsive polymer solution has a solution temperature; allowing the solution temperature to deviate toward the surface temperature to a deposited temperature at which the non-conductive polymer is immobile; and allowing the non-conductive polymer to accumulate on the electrically conductive target to form a layer, having a thickness sufficient to repulse the incident spray.

The apparatus 94 may further include a spray current meter 121 adapted to measure and optionally to record a current of a spray material ejected from the spraying device. The spray current meter 121 may communicate with and be controlled by the computing device 120.

The apparatus 94 may further include a spray flowrate meter 122 adapted to measure and optionally to record a flowrate of a spray material ejected from the spraying device. The spray flowrate meter 122 may communicate with and be controlled by the computing device 120.

The apparatus 94 may further include a spray flowrate controller 123 adapted to control a flowrate of a spray material ejected from the spraying device. The spray flowrate controller 123 may communicate with and be controlled by the computing device 120.

The apparatus 94 may further include a spray voltage meter 124 adapted to measure optionally to record voltage of the spray material ejected from the spraying device. The spray voltage meter 124 may communicate with and be controlled by the computing device 120.

The apparatus 94 may further include a spray voltage controller 125 adapted to control the voltage of the spray material ejected from the spraying device. The spray voltage controller 125 may communicate with and be controlled by the computing device 120.

The apparatus 94 may further include a printed material flowrate meter 126 adapted to measure and optionally to record a flowrate of a printed material ejected from the additive manufacturing device. The printed material flowrate meter 126 may communicate with and be controlled by the computing device 120.

The apparatus 94 may further include a printed material flowrate controller 127 adapted to control the flowrate of the printed material ejected from the additive manufacturing device. The printed material flowrate controller 127 may communicate with and be controlled by the computing device 120.

The apparatus 94 may further include a printed material voltage meter 128 adapted to measure and optionally to record a voltage of the printed material ejected from the additive manufacturing device. The printed material voltage meter 128 may communicate with and be controlled by the computing device 120.

The apparatus 94 may further include a printed material voltage controller 129 adapted to control the voltage of the printed material ejected from the additive manufacturing device. The printed material voltage controller 129 may communicate with and be controlled by the computing device 120.

The apparatus 94 may further include a spray conditioner 131 adapted to control the temperature of a spray material ejected from the spraying device. The spray conditioner 131 may communicate with and be controlled by the computing device 120.

The apparatus 94 may further include a printed material conditioner 132 adapted to control a temperature of the printed material ejected from the additive manufacturing device. The printed material conditioner 132 may communicate with and be controlled by the computing device 120.

The apparatus 94 may further include a focusing ring 133 held at a voltage of the same polarity as the spray material. The focusing ring 133 may communicate with and be controlled by the computing device 120.

The apparatus 94 may further include a secondary target 134 held at a voltage between the spray and printed material.

The apparatus 94 may further include a first spray current monitor 135 to monitor a current of the sprayed material arriving at the printed material. The first spray current monitor 135 may communicate with and be controlled by the computing device 120.

The apparatus 94 may further include a second spray current monitor 136 to monitor a current of the sprayed material arriving at the secondary target. The second spray current monitor 136 may communicate with and be controlled by the computing device 120.

The apparatus 94 may further include a camera 137 to monitor stability of the spray. The camera 137 may communicate with and be controlled by the computing device 120.

The computing device may be programmed to receive data from one selected from the group consisting of the spray flowrate meter 122, the spray current meter 121, the spray voltage meter 124, the printed material flowrate meter 126, the printed material voltage meter 128, the first spray current monitor 135, the second spray current monitor 136, and combinations thereof; and to use the data to adjust one selected from the group consisting of the spray conditioner 131, the spray flowrate controller 123, the spray voltage controller 125, the printed material flowrate controller 127, the printed material voltage controller 129, the printed material conditioner 132, and combinations thereof, and to use the data to determine a completion of the process.

The apparatus 94 may further include an environmental condition controller 130 adapted to control an environmental condition within the apparatus 94, such as an environmental temperature within the apparatus. The environmental temperature controller 130 may communicate with and be controlled by the computing device 120. The environmental condition controller 130 may include a system of gas circulators 138 and filters to regulate a composition of a surrounding atmosphere 141; a conditioning system 139 to raise or lower a temperature of the surrounding atmosphere 141; and a pumping or pressurization system 140 to increase a relative pressure of the surrounding atmosphere 141.

Figure 7:
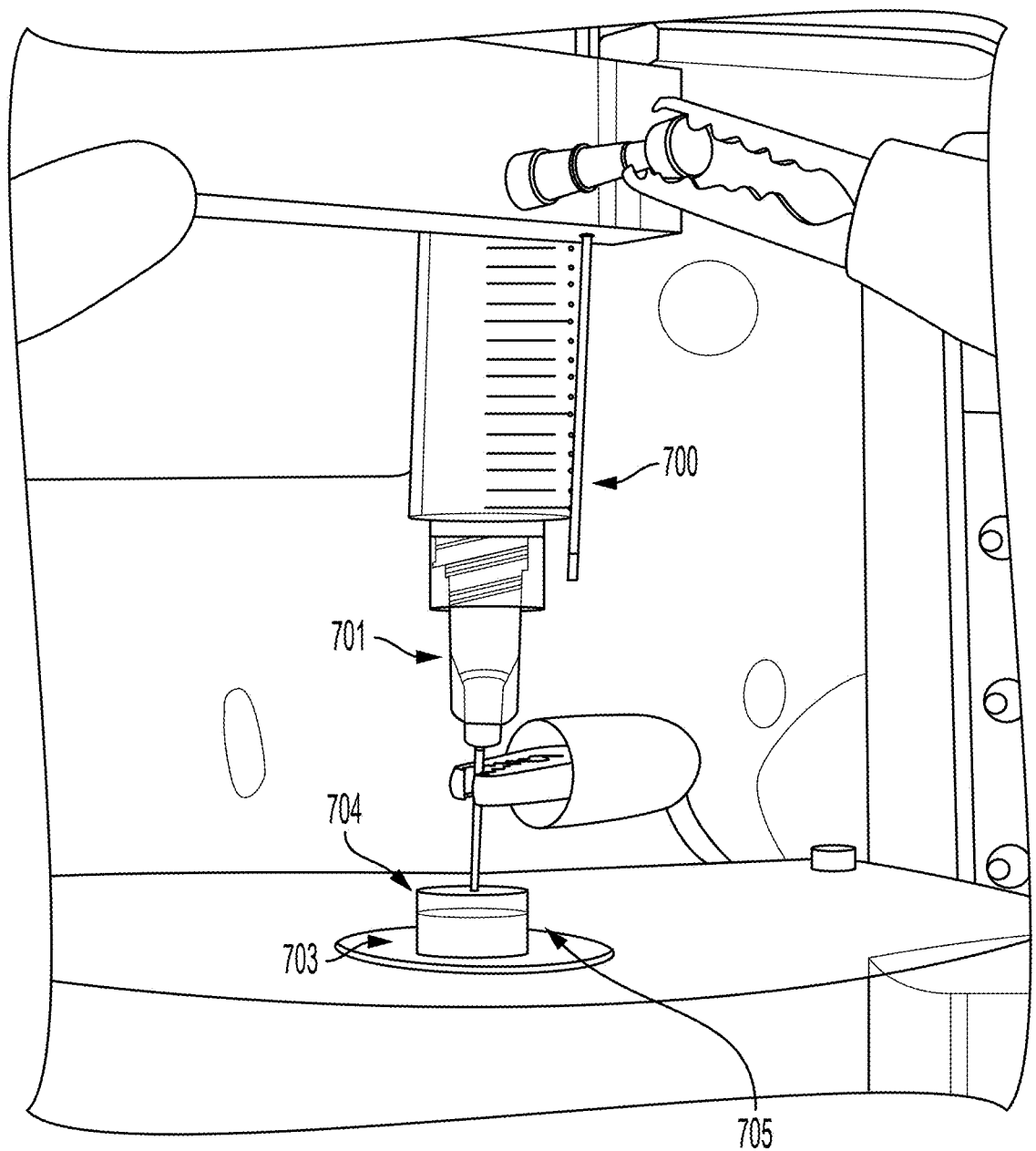

FIG. 7 is an example according to various embodiments of a gelatin solution 705 being printed out of a moving, grounded nozzle 701 proximate to a high-voltage electrospray nozzle spraying a dyed SLED coating. The gelatin solution was 50 mg/mL gelatin in 0.1 M phosphate-buffered saline. The spray composition was 1% PS in 2-butanone with trace Solvent Green dye. When the SLED sprayer 700 is "on" 703 the printed gelatin is coated, when it is "off" 704 it is not. The print and the nozzle are the only grounds present and therefore are the only objects coated. This demonstrates that the ground can be generated during spray.

Figure 8:
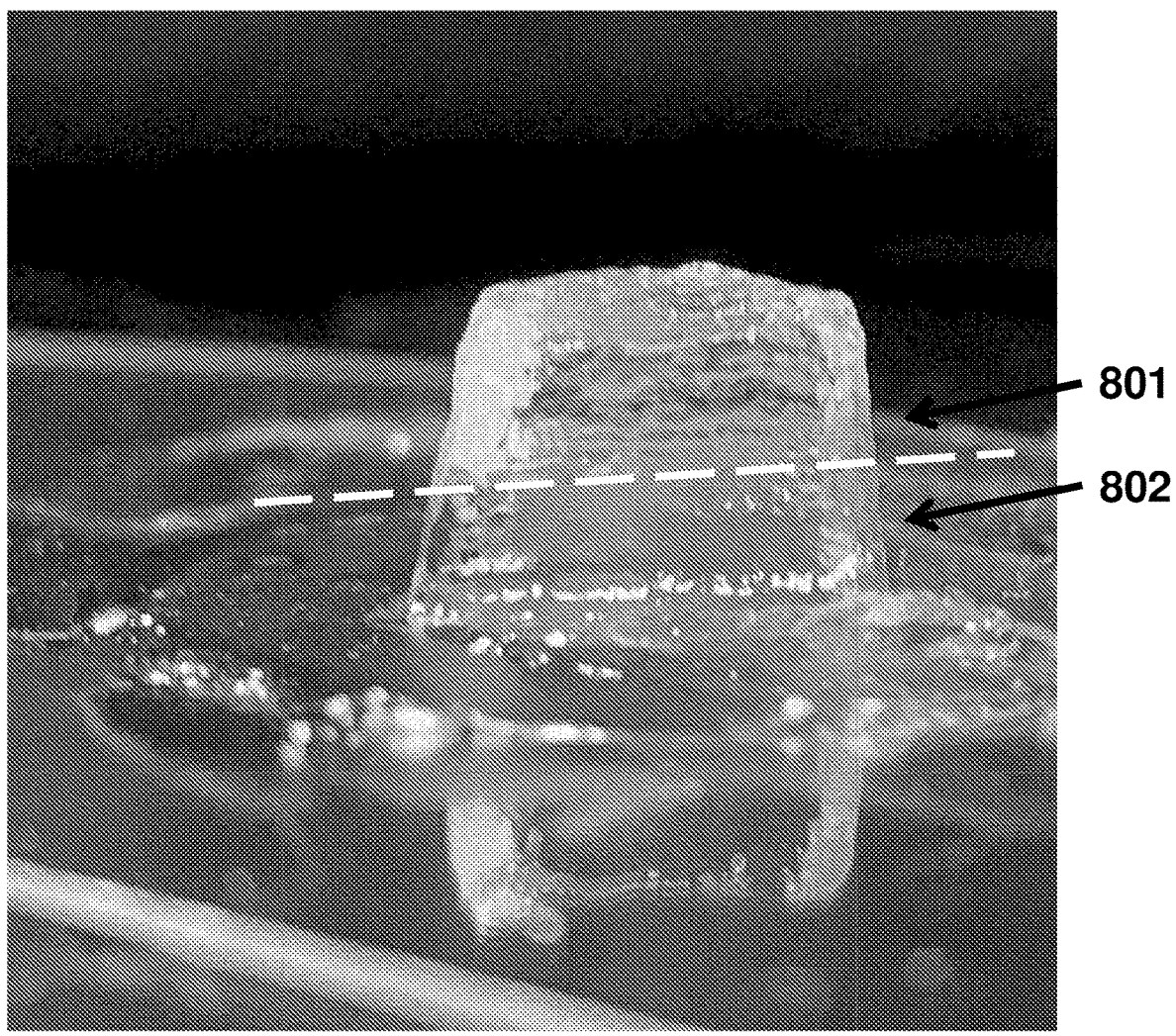

FIG. 8 is an example according to various embodiments of a gelatin structure made through the process shown in FIG. 7 cut open to reveal internal coating where the sprayer was off 801 and on 802. A white dashed line is provided as guided to the eye.

Various embodiments relate to a device built to conduct simultaneous spray print that may include a variety of new features, including but are not limited to: (1) a means to monitor and regulate the spray current arriving at the component or some other part of the assembly to track the rate of coating, (2) a single or multiple flow control for the spray solution(s), (3) positive and/or negative high voltage controls for the sprayer, any focusing rings/masks/substrates, and/or the target, (4) temperature control for the spray solutions and/or print material and/or bed, (5) humidity and atmospheric control for the print chamber, and (6) software to integrate and regulate (1-6). As the component 92 is being printed by the printing device 95, areas of the component may simultaneously be coated with the spray 93 via the spraying device 91, as described according to other embodiments, including but not limited to the embodiments described in FIG. 6A. The spray-compatible, nozzle-based 4D printing systems according to various embodiments may allow the coating thickness, composition, and printed structure to be varied simultaneously on the fly, allowing for seamless integration of the surface coating and the printed components, a key challenge to the pre-programming of responses within a complex structure with global or local spatial control as defined above. Both approaches can take advantage of programmability already available in additive manufacturing, such as embedded electronics for control, sensing, and wireless communication. These approaches also mitigate the inherent disadvantage of serial patterning by employing the high-resolution spray method only at the surface of the object. Specifically, in additive manufacturing methods a resolution of the print is often inherent to the tool (e.g. the size of a laser spot for selective laser melting, the size of the pixel relative to the print area in stereolithography, or the nozzle size in fused deposition modeling) and changing this size in a given print can require either expensive machinery that can perform the exchange of optics, print heads, etc. or lengthy pauses in the print to manually perform these exchanges. Similar difficulties are well known in additive manufacturing when trying to incorporate multiple materials into the same part. In scenarios where multiple materials and multiple length scales are demanded, the time and resource cost can be expected to be compounded.

By separating the surface and bulk patterning, sophisticated logic can be incorporated by synergistic spray-print coupling to pre-program responsive materials with feedback loops. For example: sensing coatings from e.g. metallic or ceramic nanoparticles providing environmental information to control electronics; shape changing porous coatings from e.g. thermal gels or shape memory polymers to initiate surface thermo- and optomechanical actuation or regulate solvomechanical bulk responses like a valve.

Figure 9:
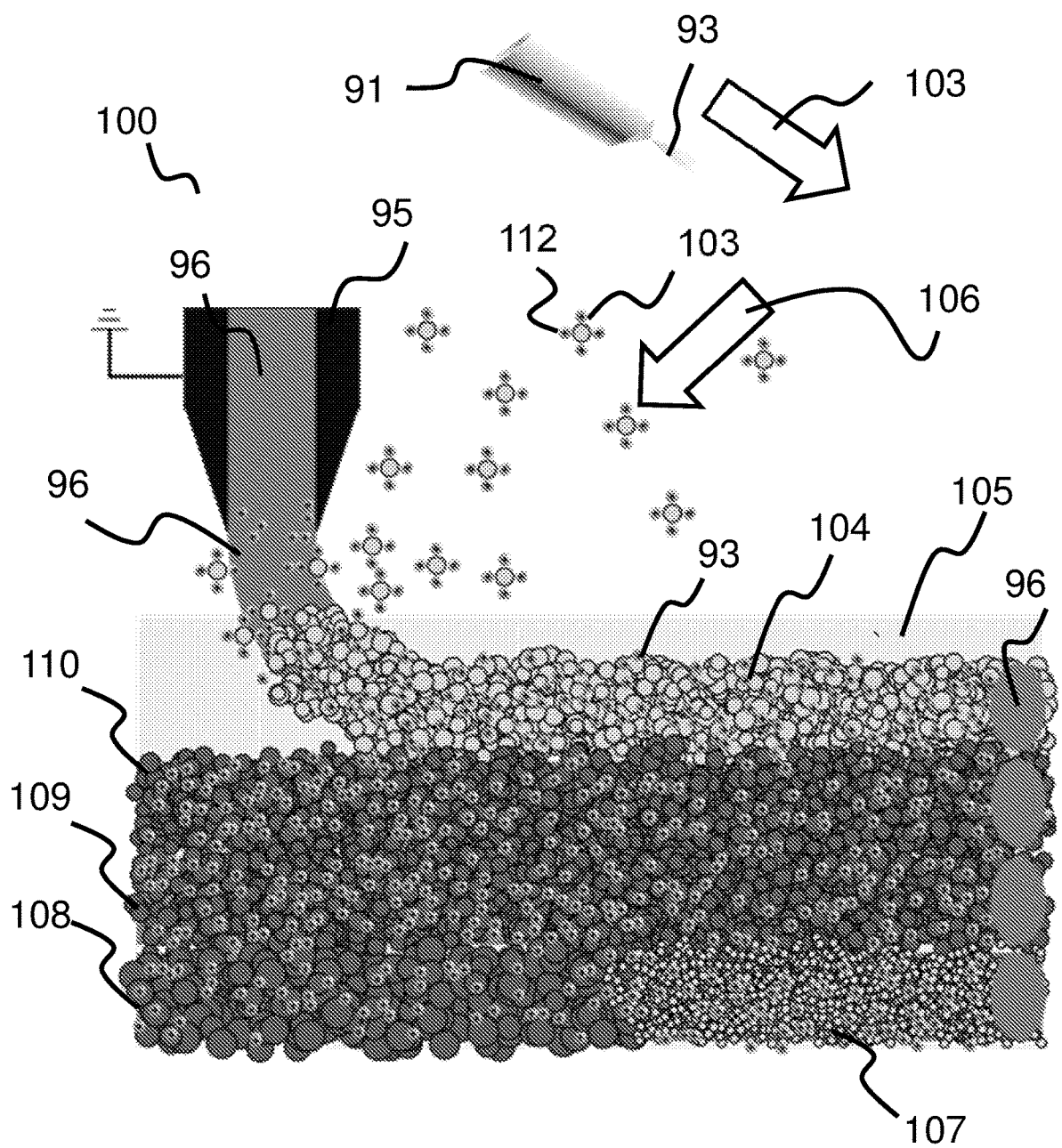

FIG. 9 is an example according to various embodiments illustrating a schematic, cross-sectional diagram of a spray-print device and method 100 of self-limiting electrospray deposition and additive manufacturing. According to the method 100, a component 105 may be printed from an additive manufacturing material 96 via a printing device 95, such as a 3D printing device, controlled by a computing device comprising a memory and a processor. As the printing device 95 ejects layers of the additive manufacturing material 96, an incident spray 93 may be ejected from a spraying device 91. The spray 93 may comprise a thermo-responsive polymer solution, as described according to various embodiments. The spray may be ejected from the spraying device 91 in the presence of an electric field. The spray may include a plurality of spray particles 112 and each of the plurality of spray particles 112 may have one or more charges 103, which may be influenced by the electric field. The spray 93 may be ejected from the spraying device 91 in a first direction 103, but, due at least in part to an interaction between the electric field and the charges 103, may be redirected in a second direction 106 toward exposed additive manufacturing material 96. Particularly if the spraying is conducted continuously throughout the ejection of the additive manufacturing material 96, then the available exposed additive manufacturing material will primarily be near an ejection nozzle of the printing device 95. Therefore, as soon as the additive manufacturing material 96 is ejected from the printing device 95, it may be conformally coated with the spray 93. The coating may have all the features as described according to other embodiments. For example the coating may have a self-limiting thickness as described according to various other embodiments, because as described according to various other embodiments, the method may further include allowing the non-conductive polymer from the spray 93 to accumulate on the structure additive manufacturing material 96 to form a layer, having a thickness sufficient to repulse the incident spray 93. This repulsive force from the thickened layer may further assist the spray 93 in being redirected in the second direction 106 toward freshly exposed additive manufacturing material 96.

Still referring to FIG. 9, various embodiments relate to a method 100 of additive manufacturing and thickness-limited, electrospray deposition. The method 100 may include ejecting an electrically-conductive target, comprising an additive manufacturing material 96, from an additive manufacturing device, such as printing device 95. As can be seen from FIG. 9, the additive manufacturing material may be ejected in a series of continuous strands. The method 100 may be used to apply the same coating or a different coating to each of the series of continuous strands. Additionally, a single strand of the additive manufacturing material 96 may include a plurality of different coatings on subparts thereof. The variety of different coatings that may be applied by the method 100 may be achieved simply by changing the composition of the spray 93 that may be sprayed continuously and simultaneously with respect to the deposition of the additive manufacturing material 96. Thus, the method may include exposing a first portion of the electrically conductive target to a first incident spray comprising a first thermo-responsive polymer solution, in the presence of an electric field. The method may further include exposing, in the presence of the electric field, a second portion of the electrically conductive target to a second incident spray, the second incident spray having a different composition than the first incident spray, the second incident spray comprising a second thermo-responsive polymer solution.

Any or all of the features described with respect to other embodiments of the self-limiting electrospray deposition methods may be utilized to adjust the coating as desired. Furthermore, such adjustments may be made one or more times during the additive manufacturing process. By way of example and not limitation, the electrically conductive target may have a surface temperature, the thermo-responsive polymer solution may include a non-conductive polymer, the thermo-responsive polymer solution may have a solution temperature, and the method may further include: allowing the solution temperature to deviate toward the surface temperature to a deposited temperature at which the non-conductive polymer is immobile; and allowing the non-conductive polymer to accumulate on the electrically conductive target to form a layer, having a thickness sufficient to repulse the incident spray. The layer may have a spherical shell surface morphology. The spherical shell surface morphology may include a plurality of spheroidal particles comprising the non-conductive polymer, wherein each of the plurality of spheroidal particles has at least one dimension less than 100 micrometers. Allowing the solution temperature to deviate toward the surface temperature to the deposited temperature at which the non-conductive polymer is immobile may prompt a spinodal decomposition of the thermo-responsive polymer solution. The layer may have a nanowire surface morphology. The nanowire surface morphology may include a plurality of elongated strands comprising the non-conductive polymer, wherein each of the plurality of elongated strands has at least one dimension less than 100 micrometers. The deposited temperature may be greater than a lower critical solution temperature of the thermo-responsive polymer solution. The deposited temperature may be less than an upper critical solution temperature of the thermo-responsive polymer solution. The thermo-responsive polymer solution may further comprise a plurality of filler particles. The filler particles may be conductive filler particles, and the method may further comprise thermally densifying the layer to at least partially remove the non-conductive polymer to form a continuous network of the conductive filler particles. The layer may have a particle volume content of from about 50 to about 90 percent. Each of the plurality of filler particles may have at least one dimension less than 10 micrometers. The non-conductive polymer may be selected from the group consisting of poly(N-isopropylacrylamide), methylcellulose, and hydroxypropyl methylcellulose. The thermo-responsive polymer solution may further include water.

It will be apparent to those having ordinary skill in the art that the methods and devices according to various embodiments may be utilized to produce a huge variety of otherwise unobtainable structures 105. The spray 93 comprising the plurality of spray particles 112 may be directed to conformally coat freshly ejected additive manufacturing material 96. The conformal coating may have a tunable, self-limiting thickness as described according to various embodiments. Depending on the volume of spray and the strength of the electric field, the conformal coating may completely coat the surface of the additive manufacturing material before it is even deposited on a substrate or on previously deposited layer of additive manufacturing material. As shown in FIG. 9, a given strand of additive manufacturing material 96 may have a first subpart, segment, or portion having a first layer or conformal coating 107 comprising a first spray material and a second subpart, segment, or portion having a second layer or conformal coating 108 comprising a second spray material. The first spray material and the second spray material may have different compositions, thicknesses, or properties. Adjacent layers or strands of the additive manufacturing material 96 may also comprise different layers or conformal coatings as can be seen by comparing coating layer 104, coating layer 107, coating layer 108, coating layer 109, and coating layer 110.

Figure 11:
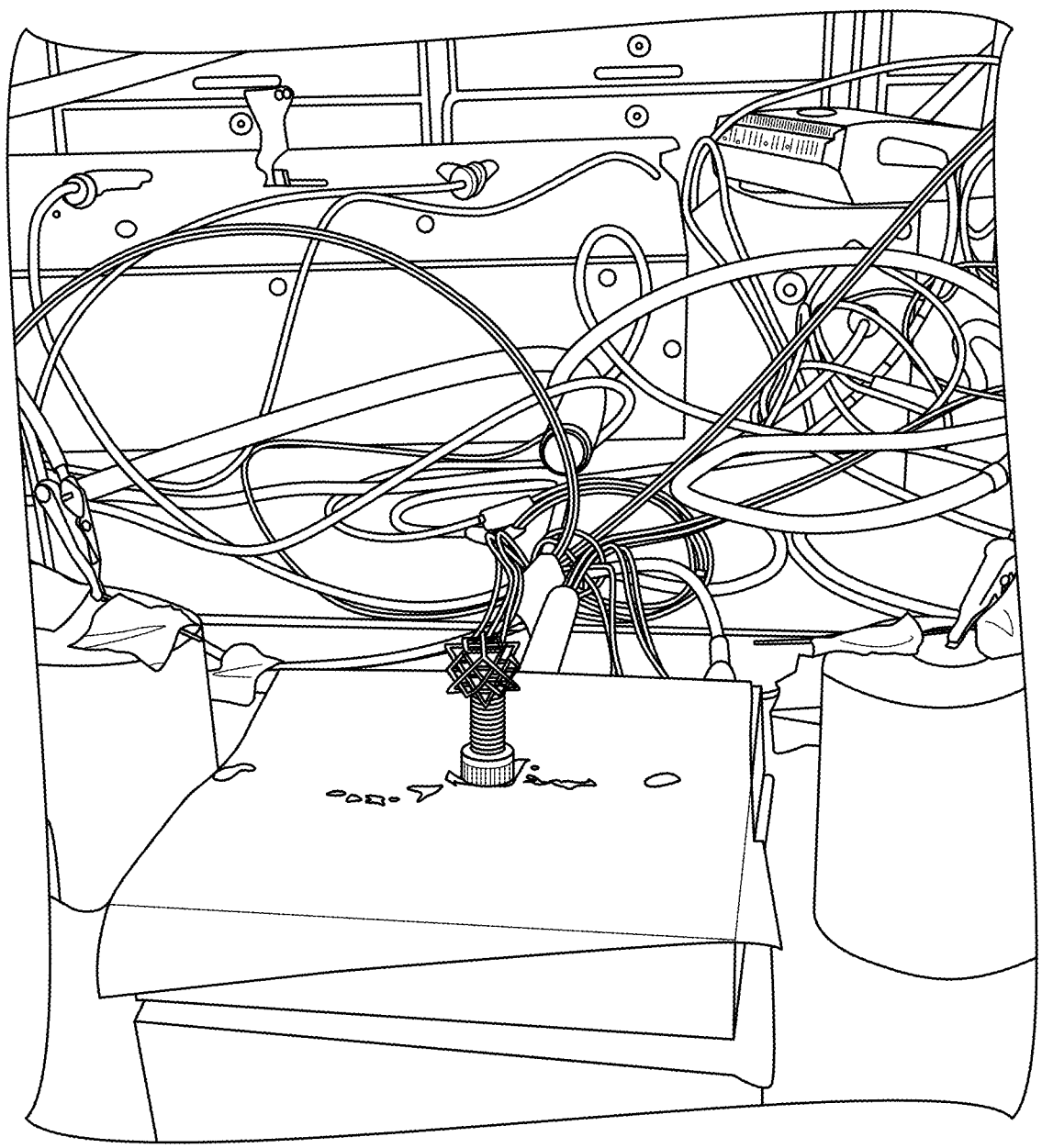

FIG. 11 is an example according to various embodiments illustrating a conformal spray chamber including two sprayers, one high voltage supply, xerogel and activated carbon filtration, a heated stage, an infrared lamp, and computer control with custom software. The photograph shows the process of coating a 3D lattice structure.

Various embodiments, therefore, relate to a three-dimensional structure comprising: an additive manufacturing material having a first portion and a second portion, wherein the first portion of the additive manufacturing material is conformally-coated with a first thin film, and wherein the second portion of the additive manufacturing material is conformally-coated with a second thin film, wherein the first thin film and the second thin film have different compositions. According to some embodiments, the first portion and the second portion may be subparts of a continuous strand of the additive manufacturing material. According to other embodiments, the first portion may be disposed adjacent to the second portion.

Various embodiments relate to the same three-dimensional structure where the transition from the first portion is sharp, being from about 1 to 10 particles in width on the print.

Various embodiments relate to the same three-dimensional structure where the transition from the first portion is gradual, occurring compositionally within the particles which may vary in composition from a single material to a plurality of materials as determined by the spray solution.

Various embodiments relate to a three-dimensional structure comprising: an additive manufacturing material having a first portion and a second portion, wherein the first portion of the additive manufacturing material is conformally-coated with a first thin film, and wherein the second portion of the additive manufacturing material is conformally-coated with a second thin film, wherein the first thin film and the second thin film have different compositions, wherein the three-dimensional structure is produced by a process comprising: ejecting the first portion from an additive manufacturing device; exposing the first portion to a first incident spray comprising a first thermo-responsive polymer solution, in the presence of an electric field, to form the first thin film; ejecting the second portion from the additive manufacturing device; and exposing the second portion to a second incident spray, comprising a second thermo-responsive polymer solution, in the presence of the electric field, to form the second thin film. According to some embodiments, the first portion and the second portion may be subparts of a continuous strand of the additive manufacturing material. According to other embodiments, the first portion may be disposed adjacent to the second portion.

The dynamic nature of the spray-print methods and devices according to various embodiments makes the electrical conductivity effects of the printed substrate much more critical. As schematically drawn in FIGS. 6A, 6B, and 9, various embodiments to allow for changes in the coating functionality as a function of position within the printed component. At the same time, according to some embodiments, it may be desirable to have anything that is printed not be coated by subsequent spray, as this would mix the functionalities of the different sprays. Practically, such embodiments require a narrow kinetic window where the spray-print process can operate. Since the SLED must complete soon after new material is deposited, the conductivity of the printed material must be low enough that the droplets that arrive during the print are sufficient to reach the self-limited coating. Simultaneously, to have consistent print performance, the conductivity of the resin must be sufficient that the grounding of the printed material can occur completely through the filament. The rational of this is that if the spray relies on grounding through the printed material into the support, the ability to dissipate this way will diminish as the print progresses and gets further from the support. Since the conduction is occurring through the filament as it emerges, there will also be a relation between the print speed, the mass-deposition rate of the spray, and the thickness of the SLED coatings.

Computational Hardware Overview

Figure 10:
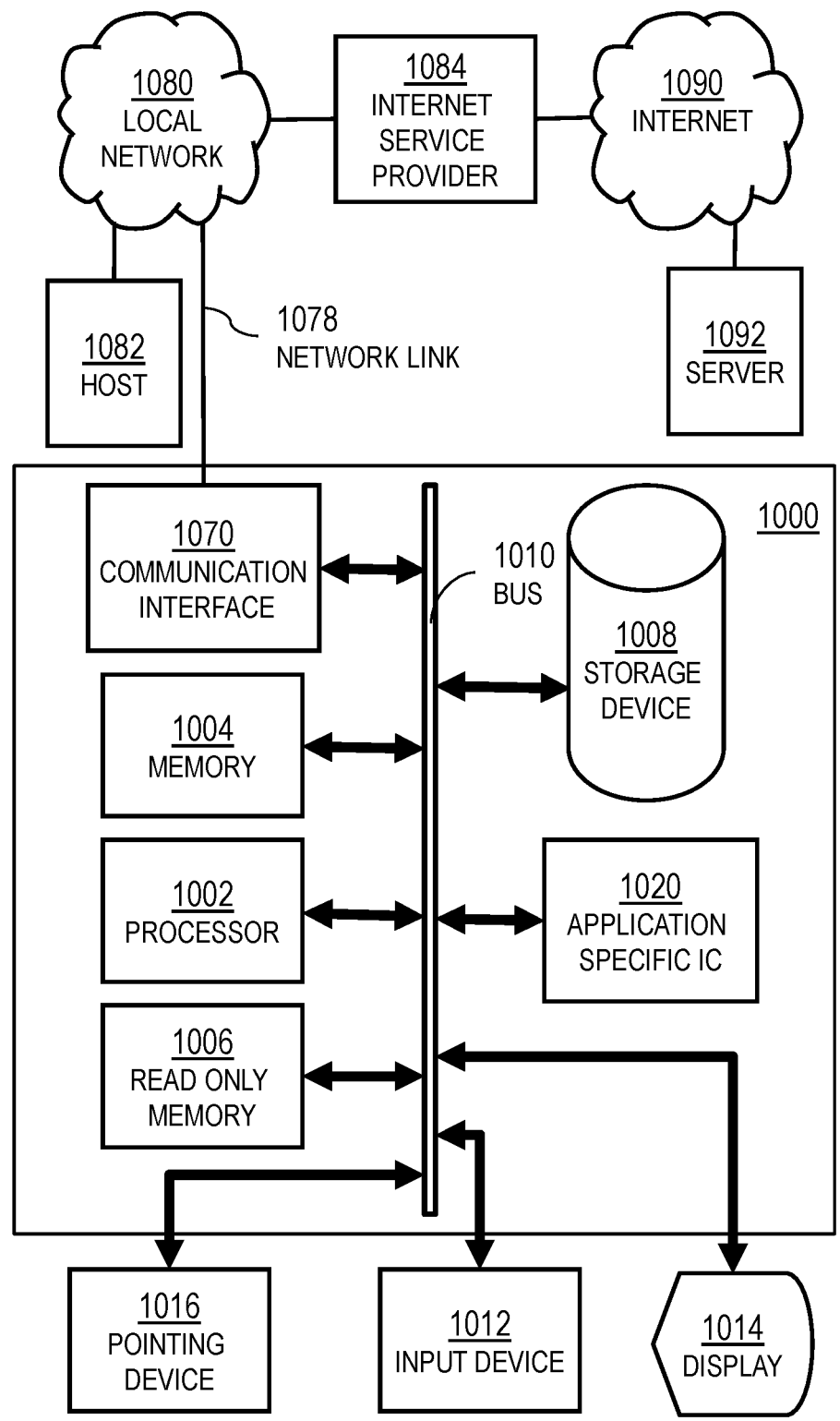

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 12:
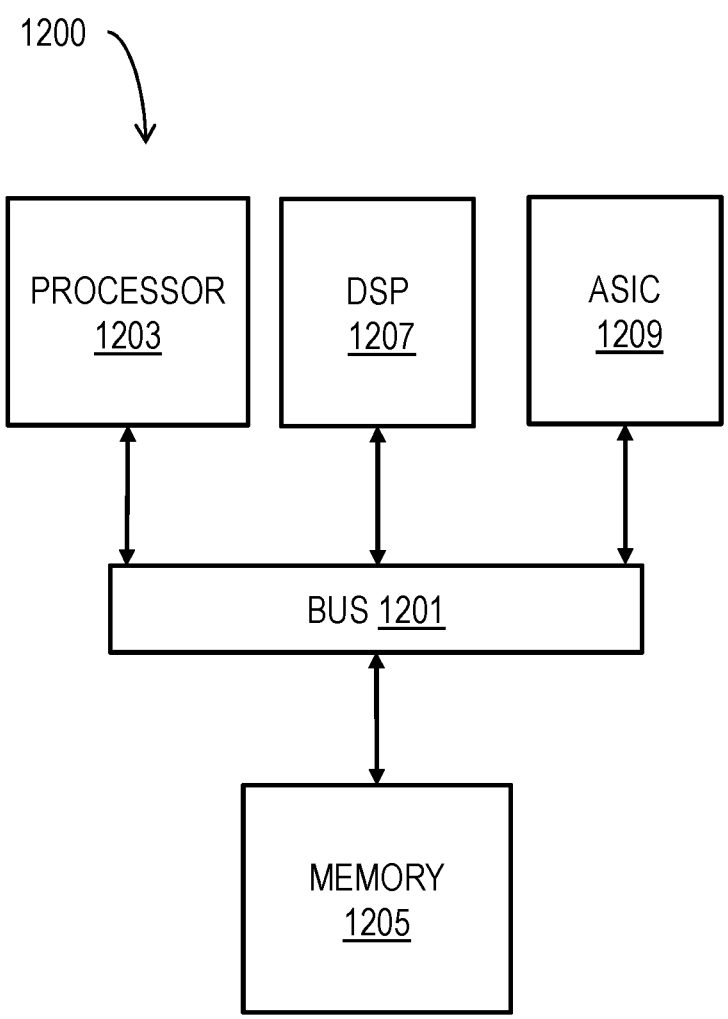

FIG. 12 illustrates a chip set 1200 upon which an embodiment of the invention may be implemented. Chip set 1200 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method of additive manufacturing and thickness-limited, electrospray deposition comprising:
   ejecting an electrically conductive target, comprising an additive manufacturing material, from an additive manufacturing device;
   exposing a first portion of the electrically conductive target to a first incident spray comprising a thermo-responsive polymer solution, in the presence of an electric field,
   receiving, at a computing device, first data from one or more components configured to measure a parameter of the ejecting;
   receiving, at the computing device, second data from one or more components configured to measure a parameter of the exposing;
   wherein the electrically conductive target has a surface temperature, wherein the thermo-responsive polymer solution comprises a non-conductive polymer,
wherein the thermo-responsive polymer solution has a solution temperature;
allowing the solution temperature to deviate toward the surface temperature to a deposited temperature at which the non-conductive polymer is immobile; and
wherein the computing device is configured to use the first data and the second data to control one or more parameters of the ejecting and the exposing to allow the non-conductive polymer to accumulate on the electrically conductive target to form a layer, having a thickness sufficient to repulse the first incident spray.

2. The method according to claim 1, wherein the steps of ejecting the electrically conductive target and exposing the electrically conductive target to the incident spray are performed simultaneously.

3. The method according to claim 1, wherein the layer has a spherical shell surface morphology.

4. The method according to claim 3, wherein the spherical shell surface morphology comprises a plurality of spheroidal particles comprising the non-conductive polymer, wherein each of the plurality of spheroidal particles has at least one dimension less than 100 micrometers.

5. The method according to claim 1, wherein the layer has a nanowire surface morphology.

6. The method according to claim 5, wherein the nanowire surface morphology comprises a plurality of elongated strands comprising the non-conductive polymer, wherein each of the plurality of elongated strands has at least one dimension less than 100 micrometers.

7. The method according to claim 1, wherein the thermo-responsive polymer solution further comprises a plurality of filler particles.

8. The method according to claim 7, wherein the filler particles are conductive filler particles, and wherein the method further comprises thermally densifying the layer to at least partially remove the non-conductive polymer to form a continuous network of the conductive filler particles.

9. The method according to claim 7, wherein the layer has a particle volume content of from about 50 to about 99 percent.

10. The method according to claim 7, wherein each of the plurality of filler particles has at least one dimension less than 10 micrometers.

11. The method according to claim 1, wherein, when the electrically conductive target is exposed to an incident spray consisting of any individual component of the thermo-responsive polymer solution, in the presence of an electric field, a film surface charge produced by deposition of any individual component of the thermo-responsive polymer solution is not able to accumulate on the electrically conductive target sufficiently to allow formation of a layer, having a thickness sufficient to repulse the incident spray.

12. The method according to claim 1 where the thickness of the layer is between 100 nm and 100 μm.

13. The method according to claim 1, further comprising exposing, in the presence of the electric field, a second portion of the electrically conductive target to a second incident spray, the second incident spray having a different composition than the first incident spray, the second incident spray comprising a second thermo-responsive polymer solution.

14. The method according to claim 13 where a transition between the first and second spray occurs over a region of 100 nm to 100 μm.

15. The method according to claim 13 where a transition between the first and second spray occurs continuously from the thermo-responsive polymer solution of the first incident spray to the second thermo-responsive polymer solution of the second incident spray.

16. The method according to claim 15 where the transition from the thermo-responsive polymer solution of the first incident spray to the second thermo-responsive polymer solution of the second incident spray is created by microfluidic mixing.

17. An apparatus comprising an additive manufacturing device, a spraying device, and a computing device programmed to control the additive manufacturing device and the spraying device to perform a method of additive manufacturing and thickness-limited, electrospray deposition, the method comprising:
ejecting an electrically conductive target, comprising an additive manufacturing material, from the additive manufacturing device;
exposing a first portion of the electrically conductive target to a first incident spray from the spraying device, the first incident spray comprising a thermo-responsive polymer solution, in the presence of an electric field,
receiving, at the computing device, first data from one or more components configured to measure a parameter of the ejecting;
receiving, at the computing device, second data from one or more components configured to measure a parameter of the exposing;
wherein the electrically conductive target has a surface temperature,
wherein the thermo-responsive polymer solution comprises a non-conductive filler particle or polymer,
wherein the thermo-responsive polymer solution has a solution temperature;
allowing the solution temperature to deviate toward the surface temperature to a deposited temperature at which the non-conductive polymer is immobile; and
wherein the computing device is configured to use the first data and the second data to control one or more parameters of the ejecting and the exposing to allow the non-conductive polymer to accumulate on the electrically conductive target to form a layer, having a thickness sufficient to repulse the first incident spray.

18. The apparatus according to claim 17, wherein the one or more components configured to measure the parameter of the exposing comprises one selected from a group consisting of:
a spray flowrate meter adapted to measure and optionally to record a flowrate of a spray material ejected from the spraying device,
a spray conditioner adapted to control the temperature of the spray material ejected from the spraying device,
a spray current meter adapted to measure and optionally to record a current of the spray material ejected from the spraying device,
a spray flowrate controller adapted to control a flowrate of the spray material ejected from the spraying device,
a spray voltage meter adapted to measure optionally to record voltage of the spray material ejected from the spraying device, and
a spray voltage controller adapted to control the voltage of the spray material ejected from the spraying device,
a focusing ring held at a voltage of the same polarity as the spray material,
a first spray current monitor to monitor a current of the spray material arriving at the printed material, a second spray current monitor to monitor a current of the spray material arriving at a secondary target,
a camera to monitor stability of the spray,
wherein the one or more components configured to measure a parameter of the ejecting comprises one selected from a group consisting of
a printed material flowrate meter adapted to measure and optionally to record a flowrate of a printed material ejected from the additive manufacturing device,
a printed material flowrate controller adapted to control the flowrate of the printed material ejected from the additive manufacturing device,
a printed material voltage meter adapted to measure and optionally to record a voltage of the printed material ejected from the additive manufacturing device,
a printed material voltage controller adapted to control the voltage of the printed material ejected from the additive manufacturing device,
a printed material conditioner adapted to control a temperature of the printed material ejected from the additive manufacturing device,
the secondary target held at a voltage between the spray and printed material, and combinations thereof;
wherein the computing device is programmed
to receive the first and second data from one selected from the group consisting of the spray flowrate meter, the spray current meter, the spray voltage meter, the printed material flowrate meter, the printed material voltage meter, the first spray current monitor, the second spray current monitor, and combinations thereof; and
to use the first and second data to adjust one selected from the group consisting of the spray conditioner, the spray flowrate controller, the spray voltage controller, the printed material flowrate controller, the printed material voltage controller, the printed material conditioner, and combinations thereof, and
to use the data to determine a completion of the process.

19. The apparatus according to claim 17, further comprising an environmental condition controller adapted to control an environmental condition within the apparatus, the environmental condition controller comprising:
a system of gas circulators and filters to regulate a composition of a surrounding atmosphere;
a conditioning system to raise or lower a temperature of the surrounding atmosphere; and
a pumping or pressurization system to increase or decrease a relative pressure of the surrounding atmosphere.

* * * * *